(12) United States Patent
Purcell

(10) Patent No.: US 6,766,617 B2
(45) Date of Patent: Jul. 27, 2004

(54) POWER SLIDING REAR WINDOW

(75) Inventor: Steven Warren Purcell, Nashville, TN (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

(21) Appl. No.: 10/217,305

(22) Filed: Aug. 12, 2002

(65) Prior Publication Data

US 2004/0025439 A1 Feb. 12, 2004

(51) Int. Cl.[7] .............................................. E05F 11/00
(52) U.S. Cl. ............................................................ 49/360
(58) Field of Search ........................... 49/360, 380, 352, 49/413

(56) References Cited

U.S. PATENT DOCUMENTS 5,784,833 A * 7/1998 Sponable et al. ............ 49/360
6,021,605 A * 2/2000 Laux et al. ................... 49/361

* cited by examiner

Primary Examiner—Jerry Redman
(74) Attorney, Agent, or Firm—Richard M. Mescher; Casimir R. Kiczek

(57) ABSTRACT

A sliding window assembly includes a lower frame member forming a channel, a guide bracket within the channel and slideable along the length of the channel, and a sliding pane carried by the guide bracket between closed and open positions. A pull-pull cable drive assembly is operably secured to the guide bracket to move the sliding pane between the closed and open positions. The drive assembly includes a drive motor, a drive drum rotateable by the drive motor, and drive cable connecting ends of the guide bracket with the drive drum. The guide bracket and the transition blocks are each mechanically locked to limit vertical movement relative to the frame member in order to reduce inadvertent tilting of the sliding pane. In one embodiment, the guide bracket includes tabs which are adhered to faces of the sliding pane to form a mechanical lock therebetween.

22 Claims, 7 Drawing Sheets

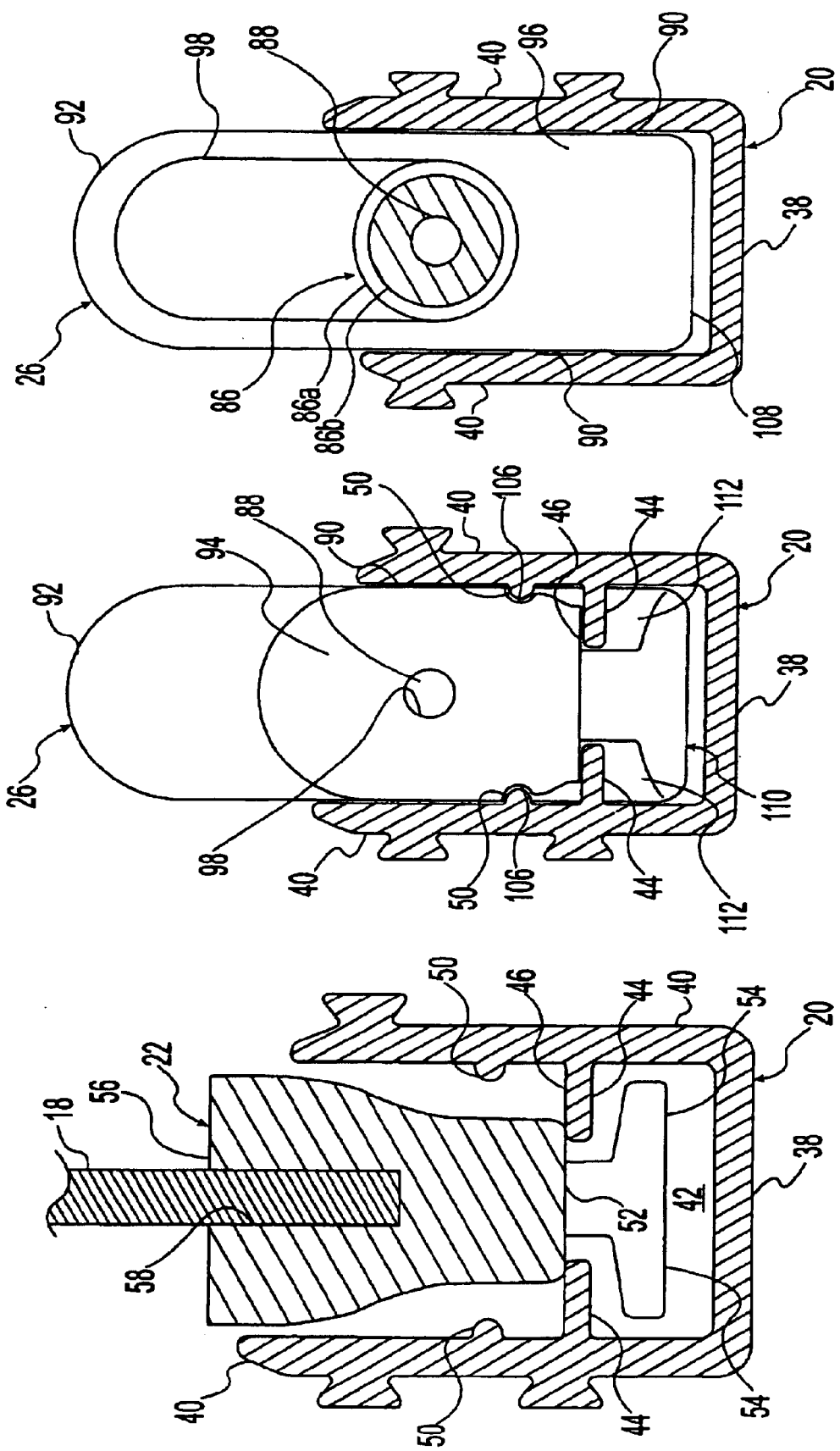

POWER SLIDING REAR WINDOW

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a motor operated vehicle window and, more particularly, to a powered sliding window for use in a motor vehicle.

BACKGROUND OF THE INVENTION

Motor vehicle window assemblies having one or more sliding panes, that is, panes which slide either substantially horizontally or vertically with respect to the window assembly, may be either manually operated or operated by an electric motor. Such window assemblies are used, for example, as rear slider windows for pick-up truck cabs, typically having a circumferential (that is, outer peripheral) frame in which are mounted one or more sliding panes along with one or more fixed panes. The frame may be structural or semi-structural in that it integrates the sliding panes and the fixed panes as a self-contained pre-assembled module suitable for shipping and handling during installation into a motor vehicle.

Power sliding window assemblies often employ a pull-pull drive system wherein drive cables apply a pulling force to the sliding pane to move it in both the opening and closing directions. See, for example, U.S. Pat. Nos. 5,724,769, 5,822,922, and 6,026,611, the disclosures of which are expressly incorporated herein in their entireties by reference. Such pull-pull drive configurations allow the cables greatly eliminates friction due to binding of the cables and the sliding pane that would be present if a pushing force were applied, thereby allowing the use of a substantially smaller, less powerful and less expensive motor. The cables are typically secured to the sliding pane at side edges near the bottom edge so that they can be hidden within the frame assembly. This construction requires relatively exact dimensional tolerances to avoid binding of the pane which can result in tilting of the pane and further binding and or removal from the frame.

Accordingly, there is a need in the art for an improved powered sliding window which can be constructed to less exacting dimensional tolerances to the frame, at reduced cost, and/or using lower cost processing equipment. Furthermore, there is a need for an improved power window having a reduced number of parts, reduced noise and vibration, and/or reduced operating failures.

SUMMARY OF THE INVENTION

The present invention provides a powered sliding window assembly which overcomes at least some of the above-noted problems of the related art. According to the present invention, a sliding window assembly includes, in combination a frame member forming a channel having a length, a width, and a height, a guide bracket located at least partially within the channel and slideable along the length of the channel, and a sliding pane carried by the guide bracket between a closed position and an open position. A pull-pull cable drive assembly operably is secured to the guide bracket to move the sliding pane between the closed and open positions. The frame member forms an interference with the guide bracket to limit movement of the guide bracket in the direction of the height of the channel to limit movement of the guide bracket out of the channel.

According to another aspect of the present invention, a sliding window assembly for a motor vehicle includes, in combination, a frame member forming a channel having a length, a width, and a height, a guide bracket located at least partially within the channel and slideable along the length of the channel, and a sliding pane carried by the guide bracket between a closed position and an open position. A pull-pull cable drive assembly operably is secured to the guide bracket to move the sliding pane between the closed and open positions. The drive assembly includes a drive motor, a drive drum rotateable by the drive motor, and a drive cable connecting ends of the guide bracket with the drive drum such that rotation of the drive drum in one direction pulls the guide bracket and the sliding pane toward the open position and rotation of the drive drum in the other direction pulls the guide bracket and the sliding pane toward the closed position. First and second transition blocks are located at least partially within the channel of the frame member at opposite ends of the frame member and each form a passage through which the drive cable passes. The frame member forms a first interference with the transition blocks to limit movement of the transition blocks in the direction along the height of the channel to limit movement of the transition blocks out of the channel, the frame member forms a second interference with each of the transition blocks to limit movement of the transition blocks in the direction toward a center of the channel along the length of the channel, and the frame member forms no interference against movement of the transition blocks in the direction away from the center along the length of the channel.

According to another aspect of the present invention, a sliding window assembly for a motor vehicle includes, in combination, a frame member forming a channel having a length, a width, and a height, a guide bracket located at least partially within the channel and slideable along the length of the channel, and a sliding pane having opposed faces and carried by the guide bracket between a closed position and an open position. The guide bracket forms a slot and an edge of the sliding pane is located within the slot. A pull-pull cable drive assembly is operably connected to the guide bracket to move the sliding pane between the closed and open positions. At least one tab is secured to the guide bracket and secured to one of the faces of the sliding pane to secure the sliding pane to the guide bracket.

From the foregoing disclosure and the following more detailed description of various preferred embodiments it will be apparent to those skilled in the art that the present invention provides a significant advance in the technology and art of powered sliding windows. Particularly significant in this regard is the potential the invention affords for providing a high quality, reliable, low cost assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 2 is a cross-sectional view taken along line 2—2 of FIG. 1, wherein the circumferential frame is removed for clarity;

FIG. 3 is a cross-sectional view taken along line 3—3 of FIG. 1, wherein the circumferential frame is removed for clarity;

FIG. 4 is a cross-sectional view taken along line 4—4 of FIG. 1, wherein the circumferential frame is removed for clarity;

Figure 1:
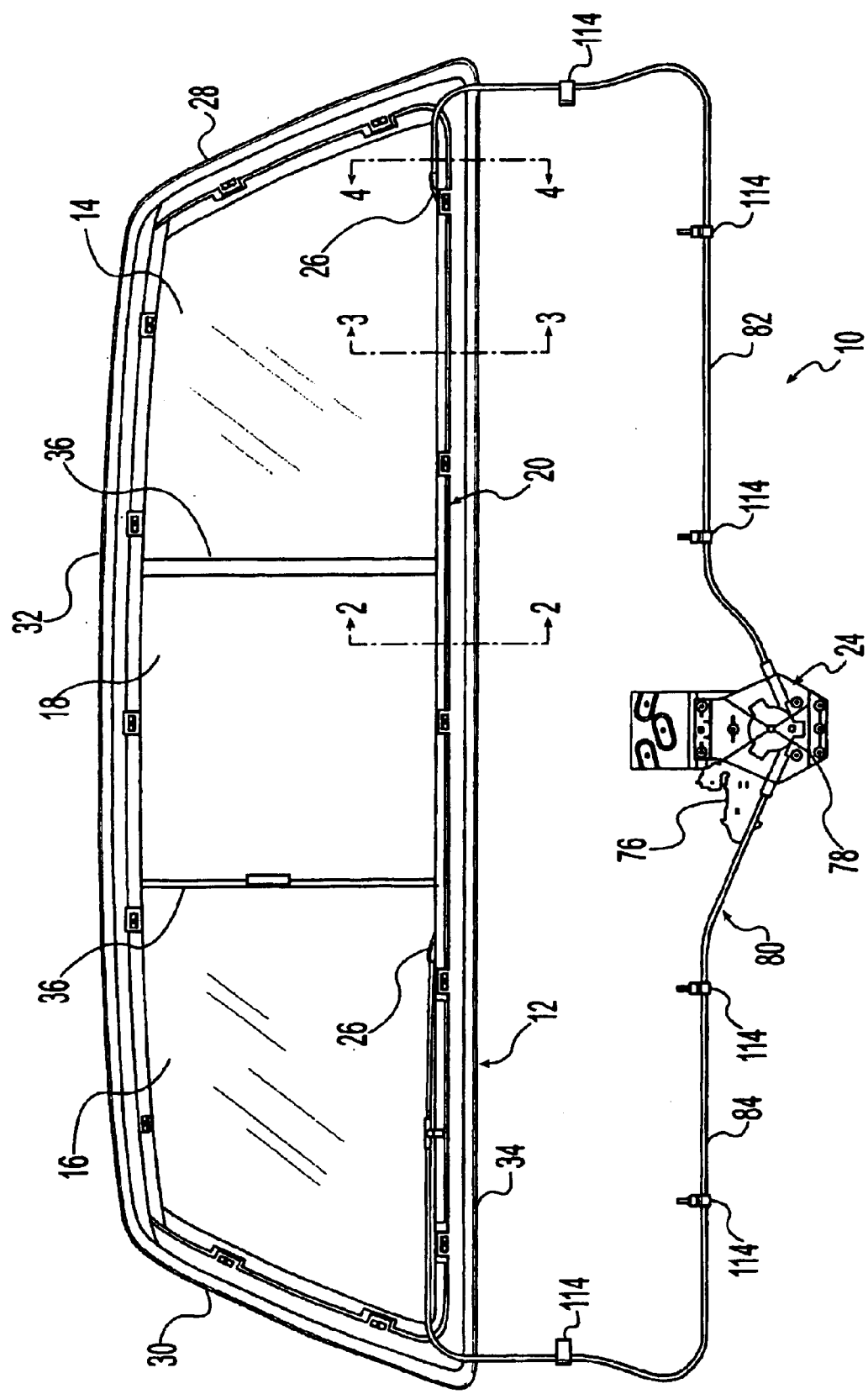
FIG. 1 is a schematic view of a power sliding window assembly suitable for use as the rear window of a pickup truck cab or the like according to a preferred embodiment of the present invention.
Figure 5:
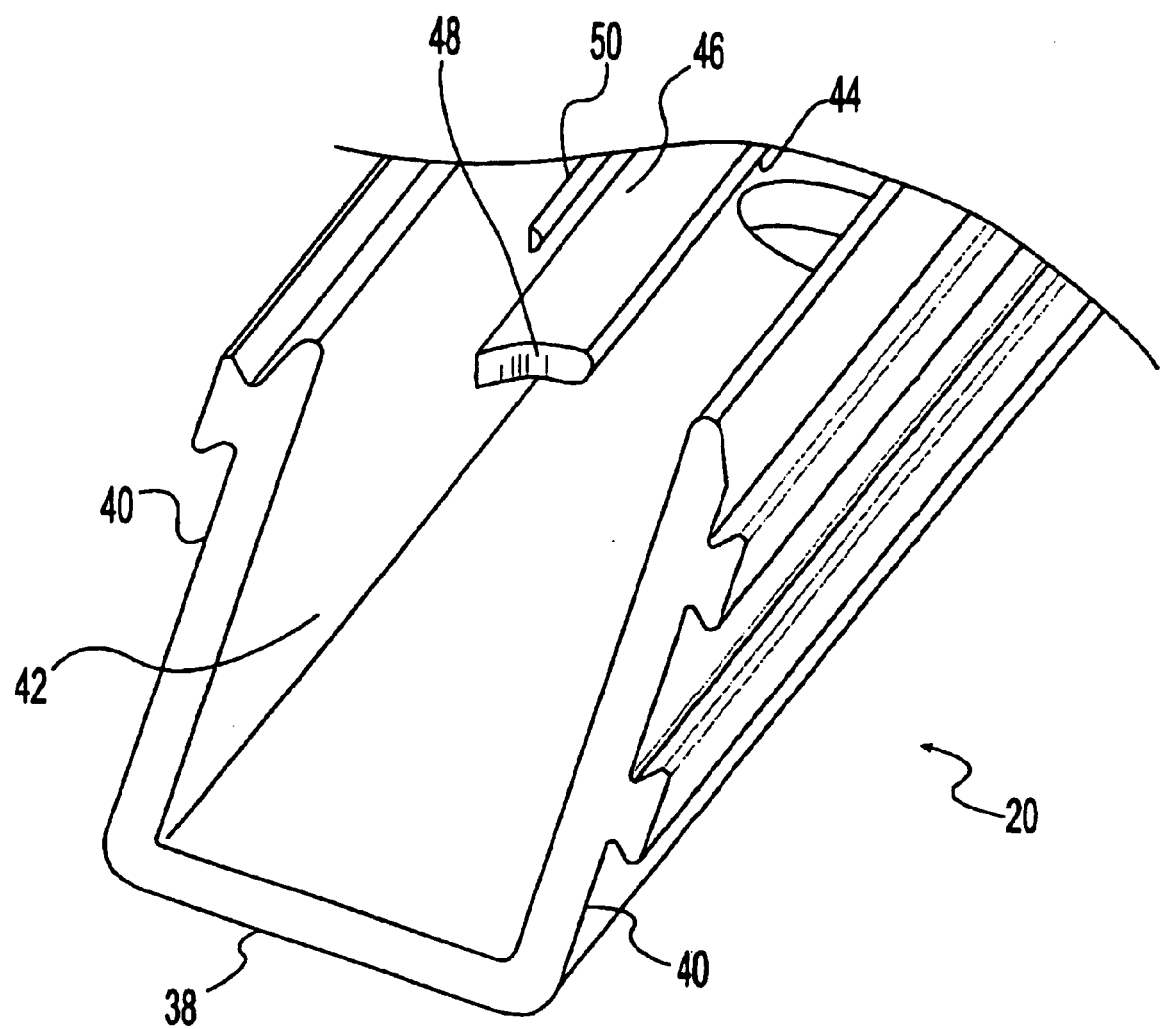
FIG. 5 is a fragmented, perspective exploded view showing an end of the lower frame member of the power sliding window assembly of FIG. 1.

It should be understood that the appended drawings are not necessarily to scale, presenting a somewhat simplified representation of various preferred features illustrative of the basic principles of the invention. The specific design features of a control system for a vehicle seat as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the power sliding window assembly illustrated in the drawings. In general, up or upward refers to an upward direction within the plane of the paper in FIG. 1 and down or downward refers to a downward direction within the plane of the paper in FIG. 1. Also in general, fore or forward refers to a direction toward the front of the vehicle, that is, out of the plane of the paper in FIG. 1 and aft or rearward refers to a direction toward the rear of the vehicle, that is, into the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved power sliding window assembly disclosed herein. The following detailed discussion of various alternative and preferred embodiments will illustrate the general principles of the invention with reference to a power sliding window assembly 10 for use closing an opening in the back of a motor vehicle, the window assembly having a sliding pane which slides horizontally within a frame. Other embodiments suitable for other applications, such as power sliding windows for side vent windows and/or vertically sliding panes will be apparent to those skilled in the art given the benefit of this disclosure.

Referring now to the drawings, FIGS. 1 to 4 schematically shows a power sliding window assembly 10 according to a preferred embodiment of the present invention viewed from a forward or inboard side. The illustrated power sliding window assembly 10 includes a circumferential frame 12, a pair of fixed panes or panels 14,16, a sliding pane or panel 18, a lower frame member 20 located along the bottom of the circumferential frame 12, a pane guide bracket or cradle 22 for slideably moving the sliding pane 18 along the lower frame member 20, a pull-pull cable drive assembly 24, and a pair of transition blocks 26 for operably connecting the drive assembly 24 to ends of the pane guide bracket 22.

The sliding pane 18 is positioned, in its closed position, between the left and right fixed panes 14, 16 respectively. The sliding pane 18 and the left and right fixed panes 14, 16 are mounted in the circuferential frame 12. The circumferential frame 12 has substantially vertical left and right frame portions 28, 30, respectively, interconnected by substantially horizontal top and bottom frame portions 32, 34. The circumferential frame 12 preferably includes at least one unitary fall-circumference member extending all the way around the perimeter. The full circumference member 12 can be formed by injection molding in place around the fixed position panes. The circumferential frame 12 can be formed of any suitable material such as, for example, a plastic. A suitable plastic is, for example, GELOY which is available from the General Electric Company. Optional left and right mullions 36 can be positioned at the junction of the sliding pane 18, in its closed position, with the left and right fixed panes 14, 16, respectively. The circumferential frame 12 may further include appliques and the like to provide decorative "Show" surfaces, that is, surfaces which will be exposed to view during normal use of the window when it is installed in the motor vehicle window opening. It is within the ability of those skilled in the art, given the benefit of the present disclosure, to design and construct circumferential frames 12 suitable to specific applications.

The left and right fixed panes 14, 16 are secured to the circumferential frame 12 at the left and right frame portions 28, 30 respectively such that they remain in their fixed positions. The fixed panes 14, 16 can be molded to, bonded to or secured to the circumferential frame 12 in any other suitable manner. The fixed panes 14, 16 can be formed of any suitable material such as, for example glass or plastic. The fixed panes 14, 16 are typically transparent but alternatively can be translucent or opaque.

The a sliding pane 18 travels between a closed position wherein the opening located between the fixed panes 14, 16 is completely closed by the sliding pane 18 (shown in FIG. 1) and an open position wherein the sliding pane 18 at least partially overlays one of the fixed panes 14, 16 in order to expose at least a portion of the opening located between the fixed panes 14, 16. The sliding pane 18 can be formed of any suitable material such as, for example glass or plastic. The sliding pane 18 is typically transparent but alternatively can be translucent or opaque. The top of the sliding pane 18 is guided in its lateral movement within an upper run channel attached to the top frame portion 32. Alternatively, the upper run channel can be formed unitary with the circumferential frame 12. The bottom of the sliding pane 18 is guided in its lateral movement within a channel formed by the lower frame member 20. The illustrated lower frame member 20 is formed separate from the circumferential frame and is attached within a channel formed by the bottom frame portion 34. Alternatively, the lower frame member 20 can be formed unitary, that is, a single component with the circumferential frame 12.

As best shown in FIGS. 2 to 5, the lower frame member 20 has a horizontal bottom wall 38 and vertical forward and rearward side walls 40 upwardly extending from the forward and rear edges of the bottom wall 38 to form a laterally extending channel 42. A pair of horizontal, opposed flanges 44 inwardly extend from the sides walls 40 within the channel 44 toward each other. The inner edges of the flanges 44 are spaced apart to form a gap or space therebetween. The flanges 44 are at the same height and their upper surfaces cooperate to form a support surface 46 for the pane guide bracket 22 as described in more detail hereinafter. The flanges 44 extend substantially the entire length of the lower frame member 20 but the ends of the illustrated flanges 44 are spaced apart from the ends of the forward and rearward walls 40 to accommodate the transition blocks 26 as described in more detail hereinafter. The ends 48 of the illustrated flanges 44 are arcuate, that is, curved to cooperate with the transition blocks 26 as described in more detail hereinafter.

A pair of horizontal, opposed protrusions or nibs 50 inwardly extend from the sides walls 40 within the channel 42 toward each other. The protrusions 50 are located above and spaced-apart from the flanges 44. The illustrated protrusions 50 are semi-circular in cross-section. The protrusions 50 are sized and shaped to cooperate with the transition block 26 to form a snap-fit connection as described in more detail hereinafter. The protrusions 50 extend substantially the entire length of the lower frame member 20 but the ends of the illustrated protrusions 50 are at or near the ends 48 of the flanges 44, that is, they are spaced apart from the ends 48 of the side walls 40 to accommodate the transition blocks 26 as described in more detail hereinafter. It is noted that the illustrated protrusions 50 extend the substantial length of the lower frame member but it is only necessary to provide the protrusions 50 along the portions of the side walls adjacent the transitions blocks 26. The lower frame member 20 can be formed by extrusion and can comprise any suitable material such as a plastic or metal. A suitable plastic is believed to be DELRIN commercially available from the Dupont Corporation.

Figure 6:
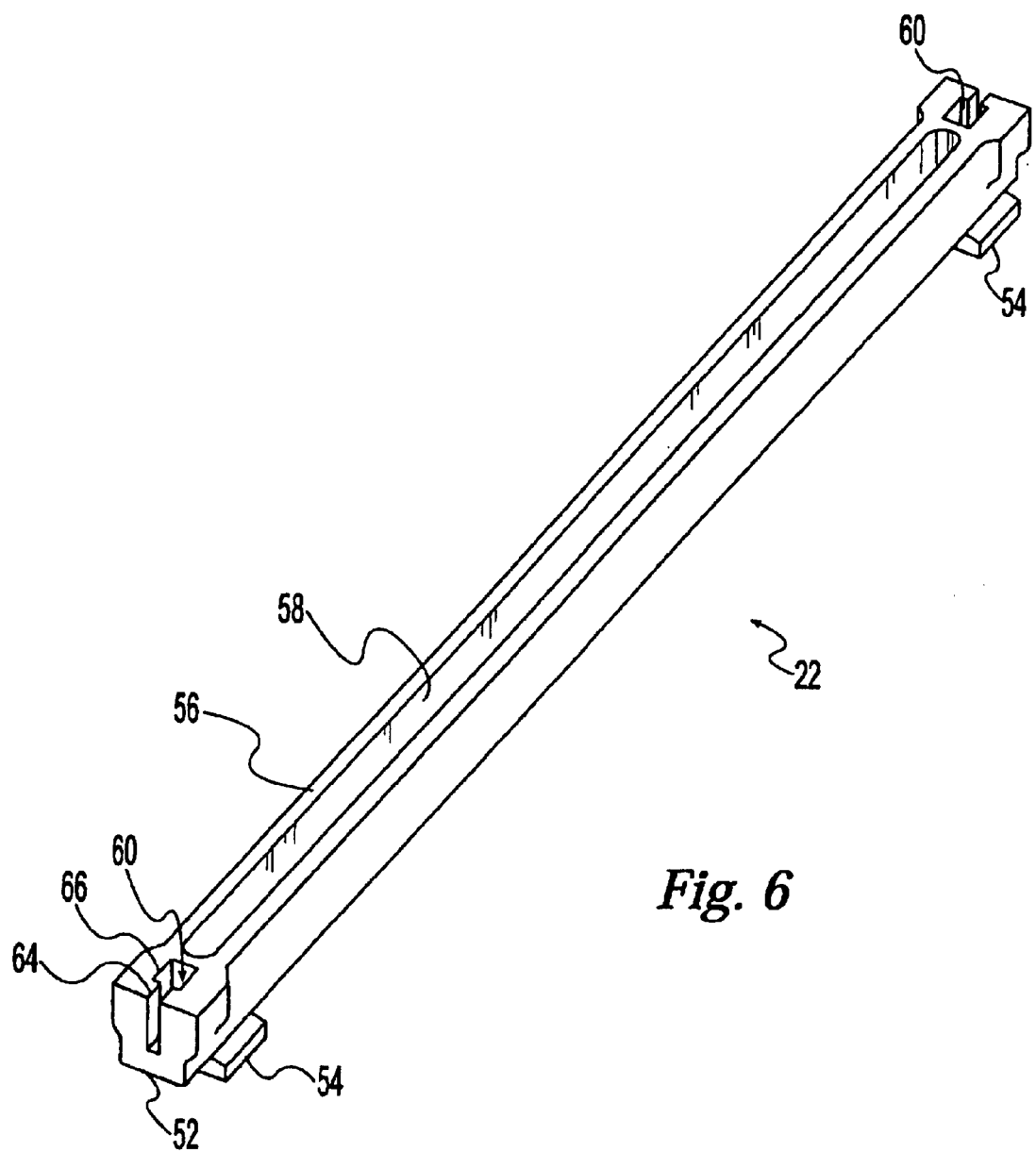
FIG. 6 is a perspective view of a pane guide bracket or cradle of the power sliding window assembly of FIG. 1.

As best shown in FIGS. 2 and 6, the pane guide bracket 22 is elongate with a generally rectangular-shaped cross section. The width of the guide bracket 22 is sized to fit between the side walls 40 of the lower frame member 20 so that the guide bracket 22 can longitudinally move within the channel 42 of the lower frame member 20. A bottom surface 52 of the guide bracket 22 is generally planar and sized to engage the upper surfaces 46 of the lower frame member flanges 44 so that the guide bracket 22 is supported by the flanges 44 and is longitudinally slideable along the flanges 44 within the channel 42.

The guide bracket 22 is mechanically locked or secured to the lower frame member 20 to limit vertical movement of the guide bracket 22 relative to the lower frame member 20. The illustrated guide bracket 22 is secured to the lower frame member 20 with an interference formed by a snap-fit engagement or connection. The snap-fit connection eliminates the need for separate fasteners and makes installation quicker. The snap-fit connection relies upon the resiliency or position memory of at least one flexible or deformable member of a component to establish a position locking location relative to a corresponding member or orifice in the other member. Typically and preferably this is accomplished by simply pushing the two components together. The illustrated guide bracket 22 is provided with a pair of opposed legs 54 located near each end of the guide bracket 22. The illustrated legs 54 are generally rectangular in cross-section. The legs 54 are spaced apart from the bottom surface 52 of the guide bracket 22 a distance adequate to receive the flanges 44 of the lower frame member 20 therebetween. The illustrated legs 54 are spaced apart from the bottom surface 2 a distance which permits limited movement of the guide bracket 22 relative to the lower frame member 20 but prevents further vertical movement of the guide bracket 22 when the legs 54 engage the flanges 44. The illustrated legs 54 are located near the ends of the guide bracket 22 and extend for a limited length but alternatively can extend for the length of the guide bracket 22. One or both of the guide bracket 22 and the lower frame member 20 are preferably formed of a resilient material so that the guide bracket 22 can be snap-fit into the lower frame member 20 by pushing the guide bracket 22 into the channel 42 as one or both of the flanges 44 and the legs 54 deflect to permit the legs 54 to pass below the flanges 44 and then resiliently snap back into their interfering position to limit vertical movement of the guide bracket 22 relative to the lower frame member 20. It is noted that the guide bracket 20 alternatively can be inserted into the lower frame member 20 by longitudinally sliding into the channel 42 from one of the ends of the channel 42.

A top surface 56 of the guide bracket 22 has a central slot or channel 58 formed therein which is closed at its ends. The central channel 58 is sized to receive the bottom edge of the sliding pane 18 therein. The central channel 58 can be sized to form a tight or interference fit with the sliding pane 18 to retain the sliding pane 18 in the central cannel 58 via friction. For example, the channel has a slot of about 3.8 mils when the sliding pane 18 has a thickness of about 4 mils. It is believed that an interference of about 2.5 mils is adequate. The ends of the guide bracket 22 form cable end-ball cups or socket 60. Each cup 60 is sized to receive a cable end-ball 62 (FIG. 10) as described in more detail hereinafter. The cup 60 widens from a slot 64 sized to closely receive a cable core to a larger opening 66 sized to snugly receive the end-ball 63. The guide bracket 22 can comprise any suitable material such as a plastic or metal. A suitable plastic is believed to be DELRIN commercially available from the Dupont Corporation.

Figure 7:
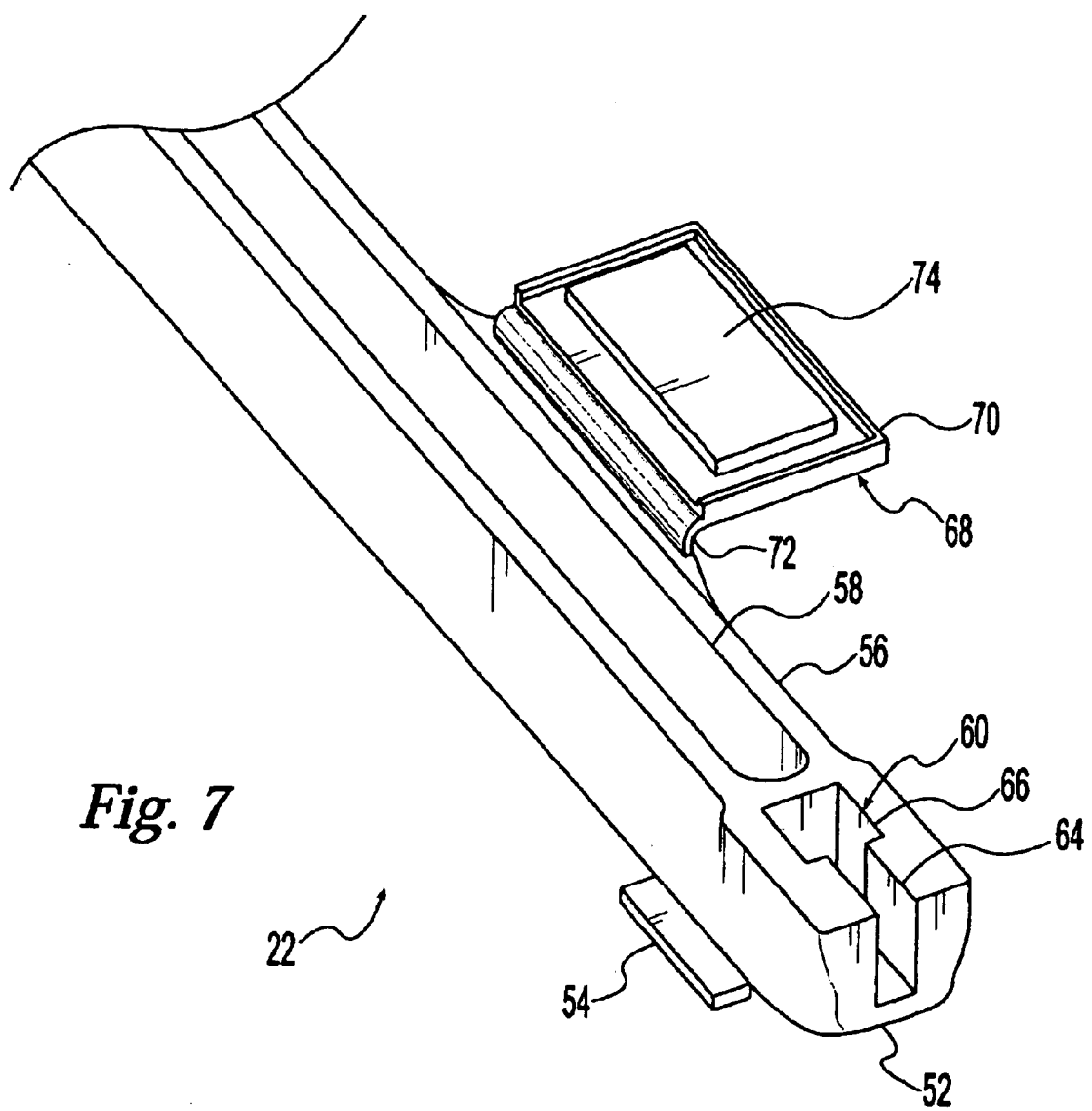
FIG. 7 is a fragmented, perspective view showing an end of an alternative embodiment of the pane guide bracket of FIG. 6.
Figure 8:
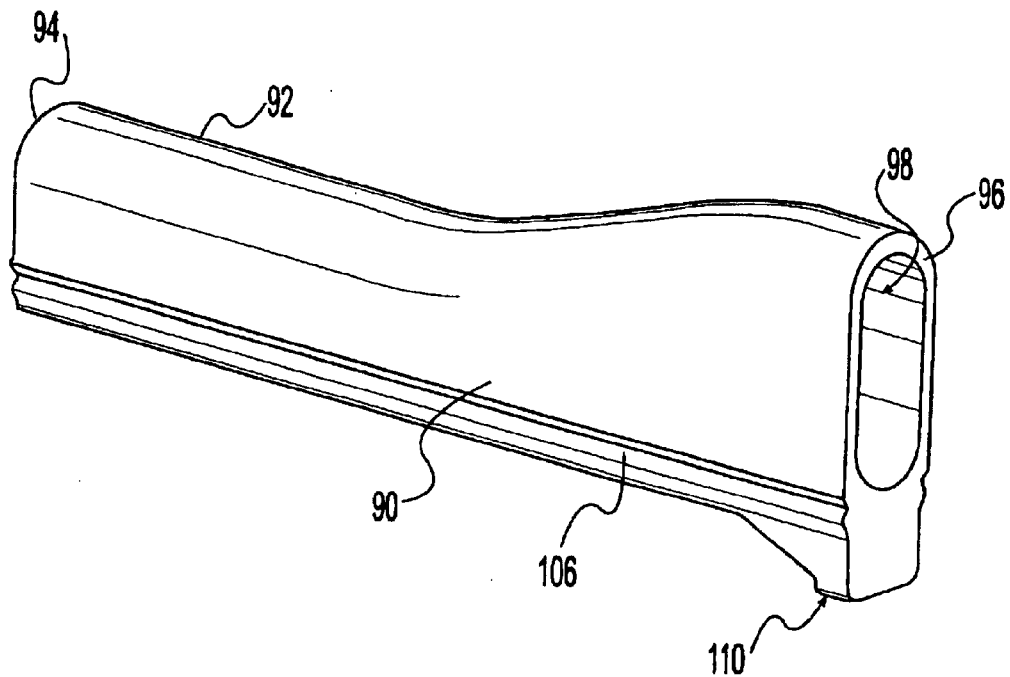
FIG. 8 is a perspective view of a transition block of the power sliding window assembly of FIG. 1.
Figure 9:
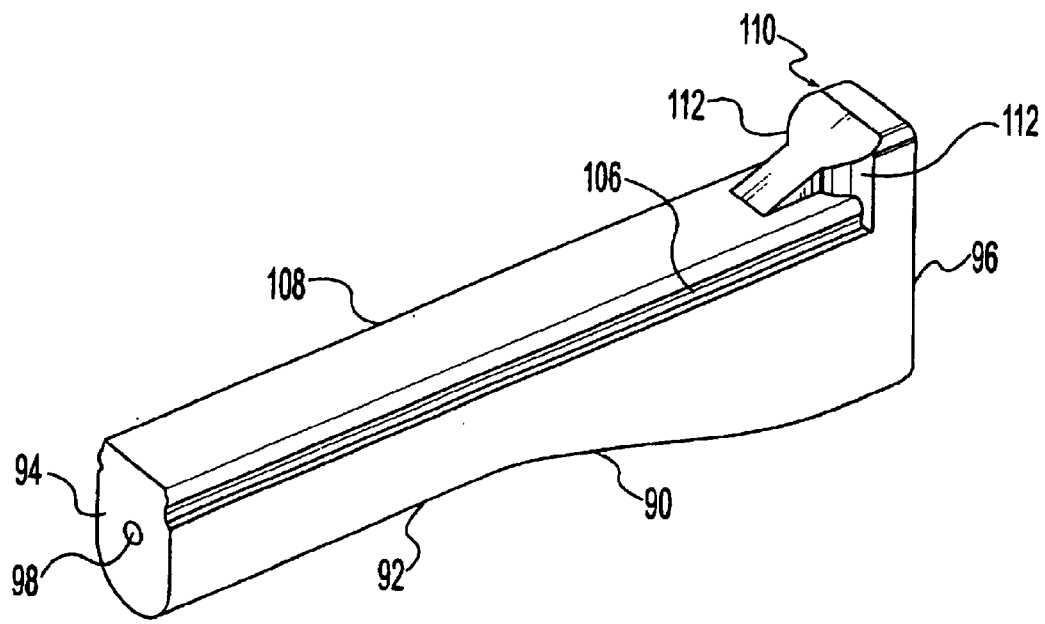
FIG. 9 is another perspective view of the transition block of FIG. 8.

FIG. 7 illustrates alternative guide bracket 22 which includes a connector 68 to secure the sliding pane 18 to the guide bracket 22 and substantially prevent movement therebetween. The guide bracket 18 includes a pair of tabs 70 which are located near the ends of the guide bracket 22. The illustrated tabs are planar members having a thickness substantially less than their length or width. The tabs 70 are each pivotably connected to the guide bracket 22 near or at an edge of the top surface 56 so that the tabs 70 can pivot about a longitudinally extending axis between a generally horizontal non-engaging position wherein the tabs 70 are spaced from the sliding pane 18 (Shown in FIG. 7) and a generally vertical engaging position wherein the tab 70 engages the side surface of the sliding pane 18. The illustrated tab 70 is pivotally connected to the guide bracket 22 with an integral living hinge 72 but other suitable types of connections or other suitable types of hinges can be utilized. The tab 70 is provided with double-sided, pressure-sensitive adhesive tape 74 to secure the tab 70 to the sliding pane 18. A suitable adhesive tape 74 is commercially available from the 3M Corporation of Minneapolis, Minn. It is noted that other types of adhesives, other types of tapes, and/or other types of connections can be utilized. With the tab 70 secured to the sliding pane 18, movement of the sliding pane 18 relative to the guide bracket 22 is substantially prevented.

Figure 10:
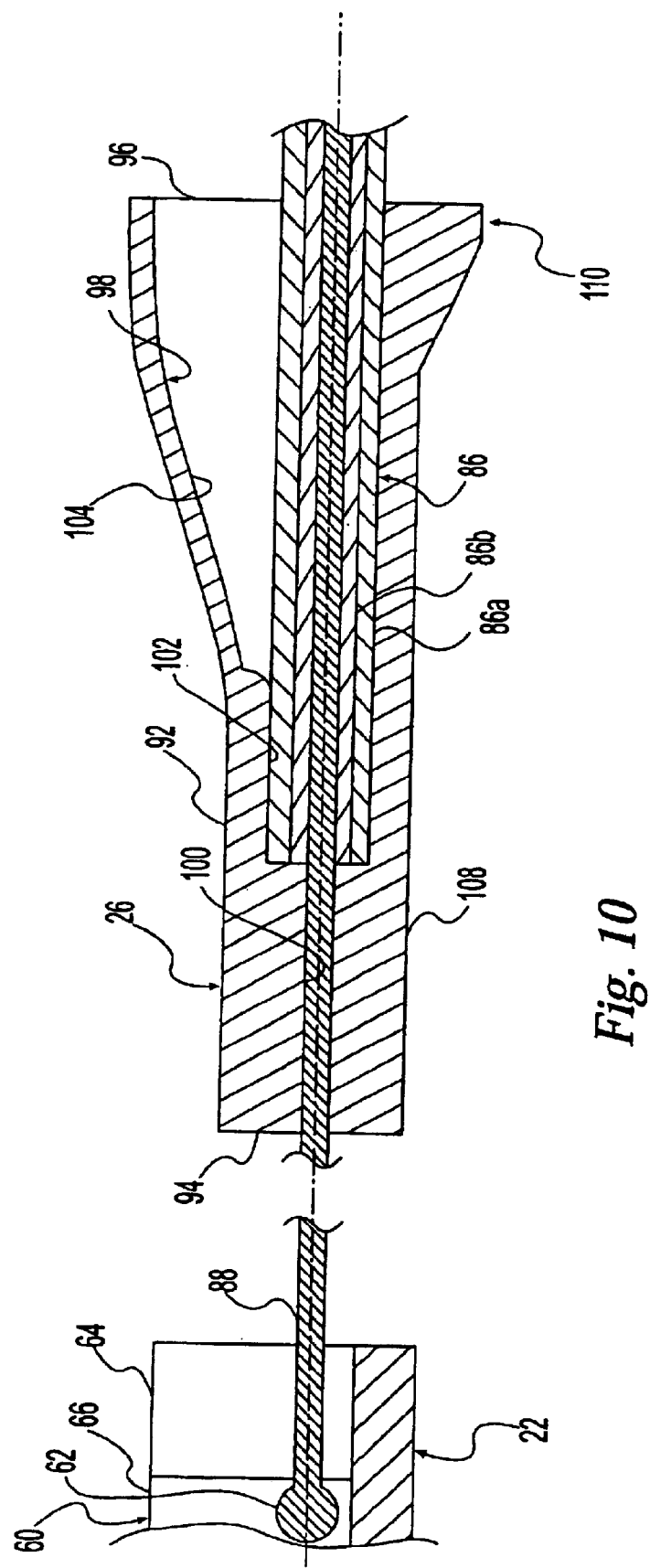
FIG. 10 is a fragmented, cross-sectional view showing a cable assembly of the power sliding window assembly of FIG. 1 between the transition block and the pane guide bracket.

As best shown in FIGS. 1 and 10, the pull-pull cable drive assembly 24 includes an electric drive motor 76, a drive drum 78, and a cable assembly 80. The drive motor 76 and drive drum 78 are mounted in a convenient location which is not necessarily adjacent the sliding window assembly 10. The illustrated drive motor 76 and drive drum 78 are mounted within the cab to sheet metal below the window assembly 10. The drive motor 76 is operatively connected to the drive drum 78 to selectively rotate the drive drum 78 in either direction about a central axis. A control switch is provided within the cab so that the operator can selectively activate the drive motor 76 in a desired manner. The cable assembly 80 includes left and right cables 82, 84 each having a conduit 86 and a core 88 which is longitudinally slideable within the conduit 88. The illustrated conduit 88 is formed by outer and inner layers 86*a*, 86*b* of different materials but alternatively the conduit 88 can be formed by a single layer or more than two layers. The ends of the core 88 are provided with the end-balls 62 or other suitable connectors. One end of each core 88 is secured to the guide bracket 22 while the other end of each core 88 is secured to the drive drum 78. It is noted that the cores 88 can be a single unitary member connected to the ends of the guide bracket 22 and wound around the drive drum 78. Secured in this manner, rotation of the drive drum 78 in a first direction wraps one of the cores 88, the left core in the illustrated embodiment, around the drive drum 78 to pull the sliding pane 18 to the left of the vehicle and the open position. As the left core 88 is wound upon the drive drum 78, the right core 88 is unwound from the drive drum 78 to allow the sliding pane 18 to move toward the left side of the vehicle. Rotation of the drive drum 78 in the other or second direction wraps the other core 88, the right core in the illustrated embodiment, around the drive drum 78 to pull the sliding pane to the right of the vehicle and the closed position. As the right core 88 is wound upon the drive drum 78, the left core 88 is unwound from the drive drum 78 to allow the sliding pane 18 to move toward the right side of the vehicle. It is noted that while the illustrated sliding pane 18 moves toward the left side of the vehicle to move from the closed position to the open position, the window assembly 10 can be constructed in an opposite manner.

The conduits 86 of the cables 82, 84 permit the cores 88 to travel along nonlinear paths. One end of each conduit 86 is secured to the lower frame member 20 by one of the transition blocks 26 and the other end of each conduit 88 is secured in a generally fixed position near the drive drum 78 and biased toward the transition block 26 by spring member.

As best shown in FIGS. 3, 4, and 8 to 10, the transition or directional blocks 26 each have generally vertical and parallel side surfaces 90. The width of the transition block 26 between the side surfaces 90 is sized such that the transition block 26 is closely received between the side walls 40 of the lower frame member 20. A top surface 92 of the illustrated transition block 26 is generally curved between the side surfaces 90. End surfaces 94, 96 are generally vertical and perpendicular to the side surfaces 90. A generally horizontal cable passage 98 extends between the end surfaces 94, 96. The illustrated cable passage 98 has a first or inner portion 100 located at the first or inner end 94 and sized for close sliding receipt of the core 88 therethrough, a second or intermediate portion 102 contiguous with the first portion 100 and sized to snugly receive the end of the conduit 86 therein to secure the conduit 86 to the transition block 26, and a third or outer portion contiguous with the second portion 102 and extending to the second or outer end 96 and sized large enough to permit inward movement of the conduit 86 therein. The illustrated third portion 104 has a constant width generally equal to a width of the second portion 102 and has an increasing height from a generally horizontal bottom which is co-linear with the second portion 102. The transition blocks 26 can comprise any suitable material such as a plastic or metal. A suitable plastic is believed to be DELRIN commercially available from the Dupont Corporation.

The transition block 26 is mechanically locked or secured to the lower frame member 20 near its end to limit vertical movement of the transition block 26 relative to the lower frame member 20. The illustrated transition block 26 is secured to the lower frame member 20 with an interference formed by a snap-fit engagement or connection. The snap-fit connection eliminates the need for separate fasteners and makes installation quicker. The snap-fit connection relies upon the resiliency or position memory of at least one flexible or deformable member of a component to establish a position locking location relative to a corresponding member or orifice in the other member. Typically and preferably this is accomplished by simply pushing the two components together. The illustrated transition block 26 is provided with a pair of opposed longitudinally extending horizontal grooves 106 in the side surfaces 90. The illustrated grooves 106 are generally semi-circular in cross-section and are sized and shaped to cooperate with the protrusions 50 on the side walls 40 of the lower frame member 20. The grooves 106 are spaced apart from the bottom surface 108 of the transition block 26 a distance such that the transition block bottom surface 108 rests upon the flanges 44 of the lower frame member 20 when the protrusions 50 are within the grooves 106. One or both of the transition block 26 and the lower frame member 20 are preferably formed of a resilient material so that the transition block 26 can be snap-fit into the lower frame member 20 by pushing the transition block 26 into the channel 42 as one or both of the protrusions 50 and grooves 106 deflect to permit the protrusions 50 to pass into the grooves 106 and then resiliently snap back into their interfering position to limit vertical movement of the transition bracket 26 relative to the lower frame member 20. Preferably, the interference substantially prevents vertical movement of the transition block 26 relative to the lower frame member 20. It is noted that the transition block 26 can alternatively be inserted into the lower frame member 20 by longitudinally sliding into the channel 42 from one of the ends of the channel.

Secured in the illustrated manner, the transition block 26 is longitudinally movable within the channel 42 of the lower frame member 20. Inward movement of the transition block 26 toward the center of the lower frame member 20 is limited by an interference between an engagement block 110 and the lower frame 20 to limit further movement of the transition block 26 toward the center of the frame member 20. The illustrated engagement block 110 extends downward from the bottom surface 108 of the transition block 26 at the outer end of the transition block 26. The engagement block 110 is provided with a pair of inward facing engagement surfaces 112 which are sized and shaped to cooperate with the ends 48 of the flanges 44 of the lower frame member 20 to limit inward horizontal movement of the transition block 26 relative to the lower frame member 20. The illustrated engagement surfaces 112 are generally curved or arcuate to cooperate with the arcuate ends 48 of the flanges 44. It is noted that other interference means for limiting the inward movement of the transition block 26 will be apparent to those skilled in the art given the benefit of this disclosure.

With the transition block 26 positioned within the channel 42 of the lower frame member 20 and the and the conduit 86 of the cable 82, 84 extending into the second portion 102 of the transition block passage 98, the transition block 26 is free to slide in an outward direction away from the center of the frame member 20 and out of the channel 42 without interference with the frame member 20. The spring member of the cable assembly 80 resiliently biases the conduit 86 toward the transition block 26 and thus resiliently biases the engagement block 26 into engagement with the flanges 44 of the lower frame member 20. The conduits 86 are routed as desired to extend the core 88 along a smooth path between the drive drum 78 and the transition blocks 26 and are secured to the cab by suitable cable fasteners 114. The third portion 104 of the transition bock passage 98 permits limited vertical movement of the conduit 86 to account for variations among cabs in order to avoid kinking or binding of the core 86 as it slides within the conduit 86. The transition blocks 26 ensure that the cores 88 extend from the transition blocks 26 to the guide bracket 22 in a substantially linear and horizontal manner, that is, parallel to the desired travel of the sliding pane 18. The cores 88 extend through the transition block 26 to the guide bracket 22 where the end-ball 62 of the core 88 is secured to the guide bracket 22 within the end-ball cup 60. It is noted that the cores 88 are unsheathed by the conduit 86 between the transition blocks 26 and the guide bracket 22. The interferences which mechanically secure and limit vertical movement of the guide bracket 22 and the transition blocks 26 relative to the lower frame member 20 substantially prevent the sliding pane 18 from tilting as the sliding pane 18 is pulled by the cores 88.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A sliding window assembly for a motor vehicle comprising, in combination:
   a frame member forming a channel having a length, a width, and a height;
   a guide bracket located at least partially within the channel and slideable along the length of the channel;
   a sliding pane;
   wherein the guide bracket forms a slot receiving an edge of the sliding pane so that the guide bracket carries the sliding pane between a closed position and an open position as the guide bracket and the slot move along the length of the channel;
   a pull-pull cable drive assembly operably secured to the guide bracket to move the sliding pane between the closed and open positions; and
   wherein the frame member forms an interference with the guide bracket to limit movement of the guide bracket in the direction of the height of the channel to limit movement of the guide bracket out of the channel.

2. The sliding window assembly according to claim 1, wherein the frame member has a bottom wall and a pair of side walls extending from opposite edges of the side wall to form the channel and opposed flanges inwardly extending from the side walls to form the interference with the guide bracket.

3. The sliding window assembly according to claim 2, wherein the guide bracket is at least partially supported by the flanges and slides along the flanges as the sliding pane is moved between the closed and open positions.

4. The sliding window assembly according to claim 2, wherein the guide bracket has a pair of opposed outwardly extending legs which are located between the flanges and the bottom wall of the frame member to form the interference.

5. The sliding window assembly according to claim 1, wherein the sliding panel is secured tot eh guide bracket to substantially prevent relative movement between the sliding pane and the slot.

6. The sliding window assembly according to claim 5, wherein the sliding pane is secured to the guide bracket with an interference fit between the sliding pane and the slot so that the sliding pane is retained in the slot by friction.

7. The sliding window assembly according to claim 5, further comprising at least one tab secured to the guide bracket and wherein the sliding pane is secured to the tab with adhesive.

8. The sliding window assembly according to claim 1, further comprising a circumferential frame surrounding the sliding pane and a pair of fixed panes.

9. The sliding window assembly according to claim 8, wherein the circumferential frame includes a bottom portion forming a frame channel and the frame member is at least partially located within the frame channel of the bottom portion.

10. A sliding window assembly for a motor vehicle comprising, in combination:
    a frame member forming a channel having a length, a width, and a height;
    a guide bracket located at least partially within the channel and slideable along the length of the channel;
    a sliding pane carried by the guide bracket between a closed position and an open position;
    a pull-pull cable drive assembly operably secured to the guide bracket to move the sliding pane between the closed and open positions;
    wherein the drive assembly includes a drive motor, a drive drum rotateable by the drive motor, and a drive cable connecting ends of the guide bracket with the drive drum such that rotation of the drive drum in one direction pulls the guide bracket and the sliding pane toward the open position and rotation of the drive drum in the other direction pulls the guide bracket and the sliding pane toward the closed position;
    first and second transition blocks located at least partially within the channel of the frame member at opposite ends of the frame member and movable in a direction along the length of the channel;
    wherein the first and second transition blocks each form a passage receiving an end of a conduit portion of the drive cable and through which a core portion of the drive cable passes to the guide bracket; and
    wherein the frame member forms a first interference with the transition blocks to limit movement of the transition blocks in the direction along the height of the channel, the frame member forms a second interference with each of the transition blocks to limit movement of the transition blocks in the direction toward a center of the channel along the length of the channel, and the frame member forms no interference against movement of the transition blocks in the direction away from the center along the length of the channel.

11. The sliding window assembly according to claim 10, wherein the frame member has a bottom wall and a pair of side walls extending from opposite edges of the side wall to form the channel and opposed protrusions inwardly extending from the side walls to form the first interference with the transition blocks.

12. The sliding window assembly according to claim 11, wherein each of the transition blocks form opposed outward facing grooves receiving the protrusions.

13. The sliding window assembly according to claim 11, wherein the protrusions are generally semicircular in cross section and extend along a length of the transition block in the direction of the length of the channel.

14. A sliding window assembly for a motor vehicle comprising, in combination:
   a frame member forming a channel having a length, a width, and a height;
   a guide bracket located at least partially within the channel and slideable along the length of the channel;
   a sliding pane carried by the guide bracket between a closed position and an open position;
   a pull-pull cable drive assembly operably secured to the guide bracket to move the sliding pane between the closed and open positions;
   wherein the drive assembly includes a drive motor, a drive drum rotateable by the drive motor, and a drive cable connecting ends of the guide bracket with the drive drum such that rotation of the drive drum in one direction pulls the guide bracket and the sliding pane toward the open position and rotation of the drive drum in the other direction pulls the guide bracket and the sliding pane toward the closed position;
   first and second transition blocks located at least partially within the channel of the frame member at opposite ends of the frame member and each forming a passage through which the drive cable passes;
   wherein the frame member forms a first interference with the transition blocks to limit movement of the transition blocks in the direction along the height of the channel, the frame member forms a second interference with each of the transition blocks to limit movement of the transition blocks in the direction toward a center of the channel along the length of the channel, and the frame member forms no interference against movement of the transition blocks in the direction away from the center along the length of the channel; and
   wherein each of the transition blocks are secured to the frame member with a snap-fit connection.

15. A sliding window assembly for a motor vehicle comprising, in combination:
   a frame member forming a channel having a length, a width, and a height;
   a guide bracket located at least partially within the channel and slideable along the length of the channel;
   a sliding pane carried by the guide bracket between a closed position and an open position;
   a pull-pull cable drive assembly operably secured to the guide bracket to move the sliding pane between the closed and open positions;
   wherein the drive assembly includes a drive motor, a drive drum rotateable by the drive motor, and a drive cable connecting ends of the guide bracket with the drive drum such that rotation of the drive drum in one direction pulls the guide bracket and the sliding pane toward the open position and rotation of the drive drum in the other direction pulls the guide bracket and the sliding pane toward the closed position;
   first and second transition blocks located at least partially within the channel of the frame member at opposite ends of the frame member and each forming a passage through which the drive cable passes;
   wherein the frame member forms a first interference with the transition blocks to limit movement of the transition blocks in the direction along the height of the channel, the frame member forms a second interference with each of the transition blocks to limit movement of the transition blocks in the direction toward a center of the channel along the length of the channel, and the frame member forms no interference against movement of the transition blocks in the direction away from the center along the length of the channel; and
   wherein each of the transition blocks has an engagement block which engages the frame member to form the second interference.

16. The sliding window assembly according to claim 15, wherein the frame member has a bottom wall, a pair of side walls extending from opposite edges of the side wall to form the channel, and opposed flanges inwardly extending from the side walls, and the guide block engages the flanges to form the second interference.

17. The sliding window assembly according to claim 16, wherein the flanges have arcuate-shaped ends and the guide block has cooperating arcuate-shaped engagement surfaces which engage the ends of the flanges to form the second interference.

18. A sliding window assembly for a motor vehicle comprising, in combination:
   a frame member forming a channel having a length, a width, and a height;
   a guide bracket located at least partially within the channel and slideable along the length of the channel;
   a sliding pane having opposed faces and carried by the guide bracket between a closed position and an open position;
   wherein the guide bracket forms a slot and an edge of the sliding pane is located within the slot;
   a pull-pull cable drive assembly operably secured to the guide bracket to move the sliding pane between the closed and open positions;
   at least one tab secured to the guide bracket and secured to one of the faces of the sliding pane to secure the sliding pane to the guide bracket; and
   wherein the tab is secured to the guide bracket with a hinge.

19. The sliding window assembly according to claim 18, wherein the tab comprises plastic and is molded unitary with the guide bracket.

20. The sliding window assembly according to claim 18, wherein the tab is secured to the sliding pane with an adhesive.

21. The sliding window assembly according to claim 18, wherein the tab is unitary with the guide bracket and the hinge is a living hinge.

22. The sliding window assembly according to claim 18, wherein there are two of the tabs located near opposite ends of the sliding pane.

* * * * *

/

(12) EX PARTE REEXAMINATION CERTIFICATE (7996th)
United States Patent
Purcell

(10) Number: US 6,766,617 C1
(45) Certificate Issued: Jan. 18, 2011

(54) POWER SLIDING REAR WINDOW

(75) Inventor: Steven Warren Purcell, Nashville, TN (US)

(73) Assignee: General Electric Capital Corporation, Chicago, IL (US)

Reexamination Request:
No. 90/009,609, Dec. 23, 2009

Reexamination Certificate for:
Patent No.: 6,766,617
Issued: Jul. 27, 2004
Appl. No.: 10/217,305
Filed: Aug. 12, 2002

(51) Int. Cl.
*B60J 1/18* (2006.01)
*E05F 11/00* (2006.01)
*E05F 11/53* (2006.01)
*E05F 11/48* (2006.01)
*E05F 11/38* (2006.01)

(52) U.S. Cl. .................................. 49/360
(58) Field of Classification Search .............. 49/123
See application file for complete search history.

(56) References Cited

U.S. PATENT DOCUMENTS

| | | | |
|---|---|---|---|
| 1,199,868 A | 10/1916 | Browne |
| 1,763,603 A | 6/1930 | Donahue |
| 1,809,132 A | 6/1931 | Martin |
| 2,282,980 A | 5/1942 | Guy |
| 2,566,745 A | 9/1951 | Parsons |
| 2,597,539 A | 5/1952 | Smart |
| 2,701,162 A | 2/1955 | Kliger |
| 2,701,631 A | 2/1955 | Stouder et al. |
| 2,721,361 A | 10/1955 | Ryan et al. |
| 2,721,636 A | 10/1955 | Ordorica et al. |
| 2,770,312 A | 11/1956 | Silverman |
| 2,781,835 A | 2/1957 | Westman |
| 2,836,457 A | 5/1958 | Beeman et al. |
| 2,894,784 A | 7/1959 | Howard |
| 2,946,098 A | 7/1960 | Migneault et al. |
| 3,134,112 A | 5/1964 | Hage |
| 3,155,204 A | 11/1964 | Campbell et al. |
| 3,237,250 A | 3/1966 | Scoville |
| 3,274,740 A | 9/1966 | Hall |
| 3,332,169 A | 7/1967 | Lohr et al. |
| 3,333,362 A | 8/1967 | Kostin et al. |
| 3,376,670 A | 4/1968 | Jones |
| 3,384,997 A | 5/1968 | Heeter |
| 3,440,765 A | 4/1969 | Eskra et al. |
| 3,440,892 A | 4/1969 | Eskra |

(Continued)

FOREIGN PATENT DOCUMENTS

| | | |
|---|---|---|
| BE | 358158 | 2/1928 |
| DE | 2039313 | 5/1971 |
| DE | 3118559 A1 | 11/1982 |
| EP | 0037097 | 3/1981 |
| EP | 0449372 A2 | 3/1991 |
| EP | 0529815 A1 | 7/1992 |
| EP | 0646483 A1 | 9/1994 |
| EP | 0845340 A2 | 6/1998 |
| FR | 709660 | 5/1931 |
| FR | 2552483 | 9/1983 |
| JP | 1219280 A | 9/1989 |

*Primary Examiner*—Peter C. English

(57) ABSTRACT

A sliding window assembly includes a lower frame member forming a channel, a guide bracket within the channel and slideable along the length of the channel, and a sliding pane carried by the guide bracket between closed and open positions. A pull-pull cable drive assembly is operably secured to the guide bracket to move the sliding pane between the closed and open positions. The drive assembly includes a drive motor, a drive drum rotateable by the drive motor, and drive cable connecting ends of the guide bracket with the drive drum. The guide bracket and the transition blocks are each mechanically locked to limit vertical movement relative to the frame member in order to reduce inadvertent tilting of the sliding pane. In one embodiment, the guide bracket includes tabs which are adhered to faces of the sliding pane to form a mechanical lock therebetween.

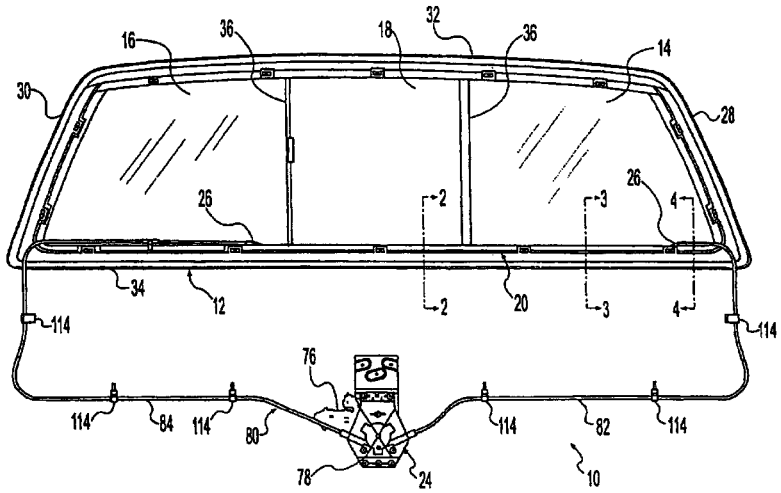
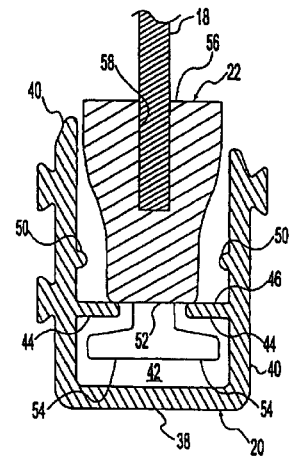

U.S. PATENT DOCUMENTS

| | | |
|---|---|---|
| 3,468,738 A | 9/1969 | Deisenroth |
| 3,478,475 A | 11/1969 | Strack |
| 3,635,100 A | 1/1972 | Littmann |
| 3,759,004 A | 9/1973 | Kent |
| 3,770,312 A | 11/1973 | Shadburn |
| 3,774,363 A | 11/1973 | Kent |
| 3,808,742 A | 5/1974 | Ehret et al. |
| 3,893,260 A | 7/1975 | Cadiou |
| 3,893,261 A | 7/1975 | Cribben |
| 3,900,965 A | 8/1975 | Mummert |
| 3,967,424 A | 7/1976 | Gates |
| 4,072,340 A | 2/1978 | Morgan |
| 4,093,304 A | 6/1978 | Ziegler |
| 4,106,239 A | 8/1978 | Bancroft et al. |
| 4,119,341 A | 10/1978 | Cook |
| 4,124,054 A | 11/1978 | Spretnjak |
| 4,139,234 A | 2/1979 | Morgan |
| 4,157,634 A | 6/1979 | Coulston |
| 4,158,270 A | 6/1979 | Cherbourg et al. |
| 4,170,847 A | 10/1979 | Pickles |
| 4,171,594 A | 10/1979 | Colanzi |
| 4,235,117 A | 11/1980 | Pickles |
| 4,317,312 A | 3/1982 | Heideman |
| 4,387,923 A | 6/1983 | Choby et al. |
| 4,389,818 A | 6/1983 | Sakamoto |
| 4,396,221 A | 8/1983 | Morgan et al. |
| 4,407,093 A | 10/1983 | Spretnjak et al. |
| 4,419,844 A | 12/1983 | Kreisfeld |
| 4,502,248 A | 3/1985 | Thomas, Jr. et al. |
| 4,543,747 A | 10/1985 | Kaltz et al. |
| 4,571,278 A | 2/1986 | Kunert |
| 4,591,204 A | 5/1986 | Gallitzendoerfer et al. |
| 4,606,159 A | 8/1986 | Kunert |
| 4,608,778 A | 9/1986 | Shiraishi et al. |
| 4,635,398 A | 1/1987 | Nakamura |
| 4,660,325 A | 4/1987 | Bauer et al. |
| 4,671,013 A | 6/1987 | Friese et al. |
| 4,674,231 A | 6/1987 | Radek et al. |
| 4,700,525 A | 10/1987 | Nieboer et al. |
| 4,703,099 A | 10/1987 | Regelman |
| 4,723,809 A | 2/1988 | Kida et al. |
| 4,738,052 A | 4/1988 | Yoshida |
| 4,756,767 A | 7/1988 | Soni et al. |
| 4,785,583 A | 11/1988 | Kawagoe et al. |
| 4,793,099 A | 12/1988 | Friese et al. |
| 4,819,377 A | 4/1989 | Bauer et al. |
| 4,823,512 A | 4/1989 | Maekawa et al. |
| 4,835,907 A | 6/1989 | Heuchert |
| 4,858,988 A | 8/1989 | Morgan et al. |
| 4,889,175 A | 12/1989 | Frey et al. |
| 4,920,698 A | 5/1990 | Friese et al. |
| 4,934,098 A | 6/1990 | Prouteau et al. |
| 4,941,286 A | 7/1990 | Marscholl et al. |
| 4,970,911 A | 11/1990 | Ujihara et al. |
| 4,981,926 A | 1/1991 | Pham et al. |
| 4,995,195 A | 2/1991 | Olberding et al. |
| 5,005,317 A | 4/1991 | Saint-Louis Augustin et al. |
| 5,007,201 A | 4/1991 | D'Hoore et al. |
| 5,028,082 A | 7/1991 | Kronbetter |
| 5,042,855 A | 8/1991 | Bennett et al. |
| 5,046,283 A | 9/1991 | Compeau et al. |
| 5,054,242 A | 10/1991 | Keys et al. |
| RE33,741 E | 11/1991 | Boissevain |
| 5,099,611 A | 3/1992 | Kracht et al. |
| 5,099,706 A | 3/1992 | Irvin |
| 5,131,349 A | 7/1992 | Keller et al. |
| 5,146,712 A | 9/1992 | Hlavaty |
| 5,154,028 A | 10/1992 | Hill et al. |
| 5,161,419 A | 11/1992 | Moy et al. |
| 5,171,051 A | 12/1992 | Yada |
| 5,217,786 A | 6/1993 | Keys |
| 5,228,740 A | 7/1993 | Saltzman |
| 5,236,650 A | 8/1993 | Choby et al. |
| 5,245,788 A | 9/1993 | Riegelman |
| 5,294,168 A | 3/1994 | Kronbetter |
| 5,333,411 A | 8/1994 | Tschirschwitz et al. |
| 5,345,717 A | 9/1994 | Mori et al. |
| 5,398,449 A | 3/1995 | Kobrehel et al. |
| 5,442,880 A | 8/1995 | Gipson |
| 5,443,673 A | 8/1995 | Fisher et al. |
| 5,451,090 A | 9/1995 | Brodie et al. |
| 5,467,560 A | 11/1995 | Camp et al. |
| 5,473,840 A | 12/1995 | Gillen et al. |
| 5,505,023 A | 4/1996 | Gillen et al. |
| 5,522,191 A | 6/1996 | Wenner et al. |
| 5,531,046 A | 7/1996 | Kollar et al. |
| 5,537,782 A | 7/1996 | Klippert et al. |
| 5,542,214 A | 8/1996 | Buening |
| 5,544,458 A | 8/1996 | Fisher et al. |
| 5,551,193 A | 9/1996 | Barnett |
| 5,591,528 A | 1/1997 | Fisher et al. |
| 5,595,025 A | 1/1997 | MacPhail-Fausey |
| 5,611,180 A | 3/1997 | Agrawal et al. |
| 5,613,322 A | 3/1997 | Kobrehel |
| 5,613,323 A | 3/1997 | Buening |
| 5,613,325 A | 3/1997 | Mariel |
| 5,617,675 A | 4/1997 | Kobrehel |
| 5,623,785 A | 4/1997 | Mariel |
| 5,647,094 A | 7/1997 | Mariel |
| 5,657,580 A | 8/1997 | Kobrehel |
| 5,669,181 A | 9/1997 | Kollar et al. |
| 5,711,112 A | 1/1998 | Barten et al. |
| 5,724,769 A | 3/1998 | Cripe et al. |
| 5,724,771 A | 3/1998 | Gipson |
| 5,735,089 A | 4/1998 | Smith et al. |
| 5,743,959 A | 4/1998 | Ash et al. |
| 5,749,174 A | 5/1998 | Mariel |
| 5,775,029 A | 7/1998 | Buening |
| 5,784,832 A | 7/1998 | LeeVan |
| 5,784,833 A | 7/1998 | Sponable et al. |
| 5,787,643 A | 8/1998 | Schmuck |
| 5,799,444 A | 9/1998 | Freimark et al. |
| 5,799,449 A | 9/1998 | Lyons et al. |
| 5,804,018 A | 9/1998 | Fisher et al. |
| 5,809,706 A | 9/1998 | Neaux |
| 5,822,921 A | 10/1998 | Griepenstroh et al. |
| 5,822,922 A | 10/1998 | Grumm et al. |
| 5,832,667 A | 11/1998 | Buening et al. |
| 5,836,110 A | 11/1998 | Buening |
| 5,839,231 A | 11/1998 | Gebhart et al. |
| 5,864,987 A | 2/1999 | Mariel et al. |
| 5,864,996 A | 2/1999 | Veldman et al. |
| 5,887,393 A | 3/1999 | Vanark et al. |
| 5,915,780 A | 6/1999 | Kobrehel et al. |
| 5,941,022 A | 8/1999 | Schmuck |
| 5,996,284 A | 12/1999 | Freimark et al. |
| 6,014,840 A | 1/2000 | Ray et al. |
| 6,018,913 A | 2/2000 | Lin |
| 6,021,605 A | 2/2000 | Laux et al. |
| 6,026,611 A | 2/2000 | Ralston et al. |
| 6,032,990 A | 3/2000 | Stone et al. |
| 6,038,819 A | 3/2000 | Klein |
| 6,039,390 A | 3/2000 | Agrawal et al. |
| 6,112,462 A | 9/2000 | Kolar |
| 6,119,401 A | 9/2000 | Lin et al. |
| 6,119,402 A | 9/2000 | Wisner |
| 6,123,383 A | 9/2000 | Doerflinger et al. |
| 6,125,585 A | 10/2000 | Koneval et al. |
| 6,141,910 A | 11/2000 | Kobrehel et al. |
| 6,223,470 B1 | 5/2001 | Millard et al. |

| | | | | | | |
|---|---|---|---|---|---|---|
| 6,286,891 B1 | 9/2001 | Gage et al. | | 6,691,464 B2 | 2/2004 | Nestell et al. |
| 6,324,788 B1 | 12/2001 | Koneval et al. | | 6,748,638 B2 | 6/2004 | Dedrich et al. |
| 6,547,880 B1 | 4/2003 | Krueger et al. | | 7,003,916 B2 | 2/2006 | Nestell et al. |
| 6,591,552 B1 | 7/2003 | Rasmussen | | 2003/0070371 A1 | 4/2003 | Kobrehel |
| 6,688,659 B2 | 2/2004 | Kobrehel | | 2003/0110703 A1 | 6/2003 | Kobrehel |

US 6,766,617 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE
SPECIFICATION AFFECTED BY AMENDMENT
PRINTED HEREIN.

Column 5, lines 5-23:

As best shown in FIGS. 2 to 5, the lower frame member 20 has a horizontal bottom wall 38 and vertical forward and rearward side walls 40 upwardly extending from the forward and rear edges of the bottom wall 38 to form a laterally extending channel 42. *As seen in FIGS. 2 to 5, the lower frame member 20 has external longitudinal projections and the horizontal bottom wall 38 includes a hole.* A pair of horizontal, opposed flanges 44 inwardly extend from the side walls 40 within the channel 44 toward each other. The inner edges of the flanges 44 are spaced apart to form a gap or space therebetween. The flanges 44 are at the same height and their upper surfaces cooperate to form a support surface for the pane guide bracket 22 as described in more detail hereinafter. The flanges 44 extend substantially the entire length of the lower frame member 20 but the ends of the illustrated flanges 44 are spaced apart from the ends of the forward and rearward walls 40 to accommodate the transition blocks 26 as described in more detail hereinafter. The ends 48 of the illustrated flanges 44 are arcuate, that is, curved to cooperate with the transition blocks 26 as described in more detail hereinafter.

AS A RESULT OF REEXAMINATION, IT HAS BEEN DETERMINED THAT:

Claims 1 and 2 are cancelled.

Claims 3-5 and 8 are determined to be patentable as amended.

Claims 6, 7 and 9, dependent on an amended claim, are determined to be patentable.

New claims 23-47 are added and determined to be patentable.

Claims 10-22 were not reexamined.

3. [The sliding window assembly according to claim 2.] *A sliding window assembly for a motor vehicle comprising, in combination:*
   *a frame member forming a channel having a length, a width, and a height;*
   *a guide bracket located at least partially within the channel and slideable along the length of the channel;*
   *a sliding pane;*
   *wherein the guide bracket forms a slot receiving an edge of the sliding pane so that the guide bracket carries the sliding pane between a closed position and an open position as the guide bracket and the slot move along the length of the channel;*
   *a pull-pull cable drive assembly operably secured to the guide bracket to move the sliding pane between the closed and open positions; and*
   *wherein the frame member forms an interference with the guide bracket to limit movement of the guide bracket in the direction of the height of the channel to limit movement of the guide bracket out of the channel, wherein the frame member has a bottom wall and a pair of side walls extending from opposite edges of the bottom wall to form the channel and opposed flanges inwardly extending from the side walls to form the interference with the guide bracket,* wherein the guide bracket is a least partially supported by the flanges and slides along the flanges as the sliding pane is moved between the closed and open positions.

4. The sliding window assembly according to claim [2] *3*, wherein the guide bracket has a pair of opposed outwardly extending legs which are located between the flanges and the bottom wall of the frame member to form the interference.

5. The sliding window assembly according to claim [1] *3*, wherein the sliding panel is secured [tot eh] *to the* guide bracket to substantially prevent relative movement between the sliding pane and the slot.

8. The sliding window assembly according to claim [1] *3*, further comprising a circumferential frame surrounding the sliding pane and a pair of fixed panes.

*23. A sliding window assembly for a motor vehicle comprising, in combination:*
   *a sliding pane and a pair of fixed panes;*
   *a structural or semi-structural frame member that integrates the sliding pane and the fixed panes as a self-contained pre-assembled module, the frame member forming a channel having a length, a width, and a height;*
   *a guide bracket located at least partially within the channel and slideable along the length of the channel;*
   *wherein the guide bracket forms a slot receiving an edge of the sliding pane so that the guide bracket carries the sliding pane between a closed position and an open position as the guide bracket and the slot move along the length of the channel and has a pair of legs;*
   *a pull-pull cable drive assembly operably secured to the guide bracket to move the sliding pane between the closed and open positions;*
   *the frame member forming an interference with the legs of the guide bracket to limit movement of the guide bracket in the direction of the height of the channel to limit movement of the guide bracket out of the channel.*

*24. The sliding window assembly of claim 23 wherein the channel has a bottom wall and wherein the guide bracket is configured to be spaced from the bottom wall.*

*25. The sliding window assembly of claim 23 wherein the channel has a bottom wall and side walls to form the channel and opposed flanges inwardly extending from the side walls, and the guide bracket is at least partially supported by the flanges and is configured to be spaced from the bottom wall.*

*26. A sliding window assembly for a motor vehicle comprising, in combination:*
   *a frame member forming a channel having a length, a width, a top, a bottom, side walls including opposed flanges extending from the side walls spaced from the top and the bottom, and a height;*
   *a guide bracket located at least partially within the channel supported by and spaced from the bottom of the channel by the flanges and slideable along the length of the channel;* a sliding pane;

wherein the guide bracket forms a slot receiving an edge of the sliding pane so that the guide bracket carries the sliding pane between a closed position and an open position as the guide bracket and the slot move along the length of the channel;

a pull-pull cable drive assembly operably secured to the guide bracket to move the sliding pane between the closed and open positions; and wherein the frame member forms an interference with the guide bracket to limit movement of the guide bracket in the direction of the height of the channel to limit movement of the guide bracket out of the channel.

27. The sliding window assembly of claim 26 wherein the channel has a bottom wall and wherein the guide bracket is configured to be spaced from the bottom wall.

28. A sliding window assembly for a motor vehicle comprising, in combination:

a sliding pane and a pair of fixed panes;

a frame member that integrates the sliding pane and the fixed panes as a self-contained pre-assembled module, wherein the frame member forms:

an upwardly open lower channel having a length, a width, and a height, in a lower frame portion of the frame member, the lower channel being cooperatively formed by a bottom wall and side walls extending upwardly from the bottom wall, the height of the lower channel extending from the bottom wall upwardly to an opening at the top of the lower channel, and opposed flanges extending into the lower channel from the side walls of the lower channel at a height (i) spaced below the opening at the top of the lower channel and (ii) spaced above the bottom wall of the lower channels;

a guide bracket located at least partially within the lower channel and slideable along the length of the lower channel, wherein:

the guide bracket forms a slot receiving a bottom edge of the sliding pane so that the guide bracket carries the sliding pane between a closed position and an open position as the guide bracket and the slot move along the length of the lower channel, and the guide bracket has a pair of legs extending laterally in the lower channel below the opposed flanges; and a pull-pull cable drive assembly operably secured to the guide bracket to move the sliding pane between the closed and open positions;

wherein the opposed flanges of the lower channel of the frame member form an interference with the legs of the guide bracket to limit movement of the guide bracket in the direction of the height of the lower channel to limit movement of the guide bracket out of the lower channel when the legs engage the flanges.

29. The sliding window assembly of claim 28 wherein the frame member is bonded to the fixed panes.

30. The sliding window assembly of claim 28 wherein the frame member is molded to the fixed panes.

31. A sliding window assembly for a motor vehicle comprising, in combination:

a sliding pane and two fixed panes;

a guide bracket;

a structural or semi-structural frame that integrates the sliding pane and the fixed panes as a self-contained pre-assembled module comprising a bottom portion forming a first channel;

a frame member at least partially located within the first channel and having a bottom wall and a pair of side walls extending from opposite edges of the bottom wall to form a second channel having a length, a width, and a height and opposed flanges inwardly extending from the side walls to form an interference with the guide bracket to limit movement of the guide bracket in the direction of the height of the second channel to limit movement of the guide bracket out of the frame member, and thereby to space the sliding pane from the bottom wall of the second channel;

wherein the guide bracket is located at least partially within the second channel and slideable along the length of the channel; and forms a slot receiving an edge of the sliding pane so that the guide bracket carries the sliding pane between a closed position and an open position as the guide bracket and the slot move along the length of the second channel; and a pull-pull cable drive assembly comprising drive cables and operably secured to the guide bracket to move the sliding pane between the closed and open positions.

32. The sliding window assembly of claim 31 wherein the frame includes show surfaces.

33. The sliding window assembly of claim 31 wherein the frame is injection molded plastic and the frame member is metal and is attached within the frame.

34. The sliding window assembly of claim 31 further comprising first and second transition blocks located at least partially within the second channel of the frame member and each forming a passage through which one of the drive cables passes.

35. The sliding window assembly of claim 31 wherein the frame is a full circumference frame.

36. The sliding window assembly of claim 31 wherein the fixed panes are secured to the frame at left and right frame portions, respectively, such that they remain in their fixed positions.

37. The sliding window assembly of claim 31 wherein the fixed panes are molded to the frame.

38. The sliding window assembly of claim 31 wherein the fixed panes are bonded to the frame.

39. A sliding window assembly for a motor vehicle comprising, in combination:

a frame member forming a channel having a length, a width, and a height;

a guide bracket located at least partially within the channel and slideable along the length of the channel;

a sliding pane;

wherein the guide bracket forms a slot receiving an edge of the sliding pane so that the guide bracket carries the sliding pane between a closed position and an open position as the guide bracket and the slot move along the length of the channel;

a pull-pull cable drive assembly operably secured to the guide bracket to move the sliding pane between the closed and open positions; and wherein the frame member forms an interference with the guide bracket to limit movement of the guide bracket in the direction of the height of the channel to limit movement of the guide bracket out of the channel, wherein the frame member has a bottom wall and a pair of side walls to form the channel and opposed flanges inwardly extending from the side walls to form the interference with the guide bracket, wherein the guide bracket is at least partially supported by the flanges and slides along the flanges as the sliding pane is moved between the closed and open positions.

40. The sliding window assembly of claim 39 wherein the guide bracket is configured to be spaced from the bottom wall.

41. A sliding window assembly for a motor vehicle comprising, in combination:

a frame member forming a channel having a length, a width, and a height;

a guide bracket located at least partially within the channel and slideable along the length of the channel;

a sliding pane;

wherein the guide bracket forms a slot receiving an edge of the sliding pane so that the guide bracket carries the sliding pane between a closed position and an open position as the guide bracket and the slot move along the length of the channel;

a pull-pull cable drive assembly operably secured to the guide bracket to move the sliding pane between the closed and open positions; and wherein the frame member forms an interference with the guide bracket to limit movement of the guide bracket in the direction of the height of the channel to limit movement of the guide bracket out of the channel, wherein the frame member has a bottom wall and a pair of side walls extending from opposite edges of the bottom wall to form the channel and opposed flanges inwardly extending from the side walls to form the interference with the guide bracket, wherein the guide bracket is at least partially supported by the flanges and slides along the flanges as the sliding pane is moved between the closed and open positions; and wherein the guide bracket is configured to be spaced from the bottom wall.

42. A sliding window assembly for a motor vehicle comprising, in combination:

a sliding pane and a pair of fixed panes;

a frame member that integrates the sliding pane and the fixed panes as a self-contained pre-assembled module, the frame member forming a channel having a length, a width, and a height;

a guide bracket located at least partially within the channel and slideable along the length of the channel;

wherein the guide bracket forms a slot receiving an edge of the sliding pane so that the guide bracket carries the sliding pane between a closed position and an open position as the guide bracket and the slot move along the length of the channel and has a pair of legs;

a pull-pull cable drive assembly operably secured to the guide to move the sliding pane between the closed and open positions;

the frame member forming an interference with the legs of the guide bracket to limit movement of the guide bracket in the direction of the height of the channel to limit movement of the guide bracket out of the channel; and transition blocks at least partially disposed in the channel.

43. The sliding window assembly of claim 42 wherein the guide bracket is spaced from a bottom of the channel and the bottom of the channel includes a hole.

44. The sliding window assembly of claim 43 wherein the frame member includes external longitudinal projections.

45. The sliding window assembly of claim 42 wherein the guide bracket has at least one socket, each socket configured to removably receive a respective end of a drive cable.

46. The sliding window assembly of claim 42 wherein the transition blocks interlock with the interior of the channel.

47. The sliding window assembly of claim 42 wherein the transition blocks interlock with the interior of the channel, and wherein the transition blocks each form a passage through which a cable passes.

* * * * *

US006766617C2

(12) EX PARTE REEXAMINATION CERTIFICATE (10018th)
United States Patent
Purcell

(10) Number: US 6,766,617 C2
(45) Certificate Issued: Jan. 23, 2014

(54) POWER SLIDING REAR WINDOW

(75) Inventor: Steven Warren Purcell, Nashville, TN (US)

(73) Assignee: Dura Global Technologies, LLC, Rochester Hills, MI (US)

Reexamination Request:
No. 90/009,871, Jan. 12, 2011

Reexamination Certificate for:
Patent No.: 6,766,617
Issued: Jul. 27, 2004
Appl. No.: 10/217,305
Filed: Aug. 12, 2002

Reexamination Certificate C1 6,766,617 issued Jan. 18, 2011

(51) Int. Cl.
*E05F 11/00* (2006.01)
*E05F 15/00* (2006.01)
(52) U.S. Cl.
USPC .................................................. 49/360
(58) Field of Classification Search
USPC ............................................ 16/96 R; 49/413
See application file for complete search history.

(56) References Cited

To view the complete listing of prior art documents cited during the proceeding for Reexamination Control Number 90/009,871, please refer to the USPTO's public Patent Application Information Retrieval (PAIR) system under the Display References tab.

*Primary Examiner* — Robert M. Fetsuga

(57) ABSTRACT

A sliding window assembly includes a lower frame member forming a channel, a guide bracket within the channel and slideable along the length of the channel, and a sliding pane carried by the guide bracket between closed and open positions. A pull-pull cable drive assembly is operably secured to the guide bracket to move the sliding pane between the closed and open positions. The drive assembly includes a drive motor, a drive drum rotateable by the drive motor, and drive cable connecting ends of the guide bracket with the drive drum. The guide bracket and the transition blocks are each mechanically locked to limit vertical movement relative to the frame member in order to reduce inadvertent tilting of the sliding pane. In one embodiment, the guide bracket includes tabs which are adhered to faces of the sliding pane to form a mechanical lock therebetween.

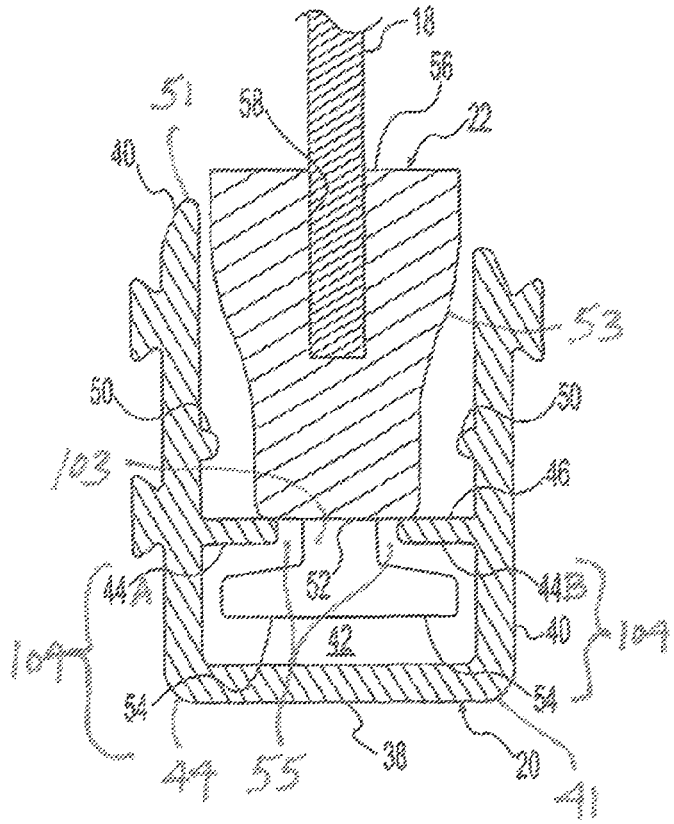

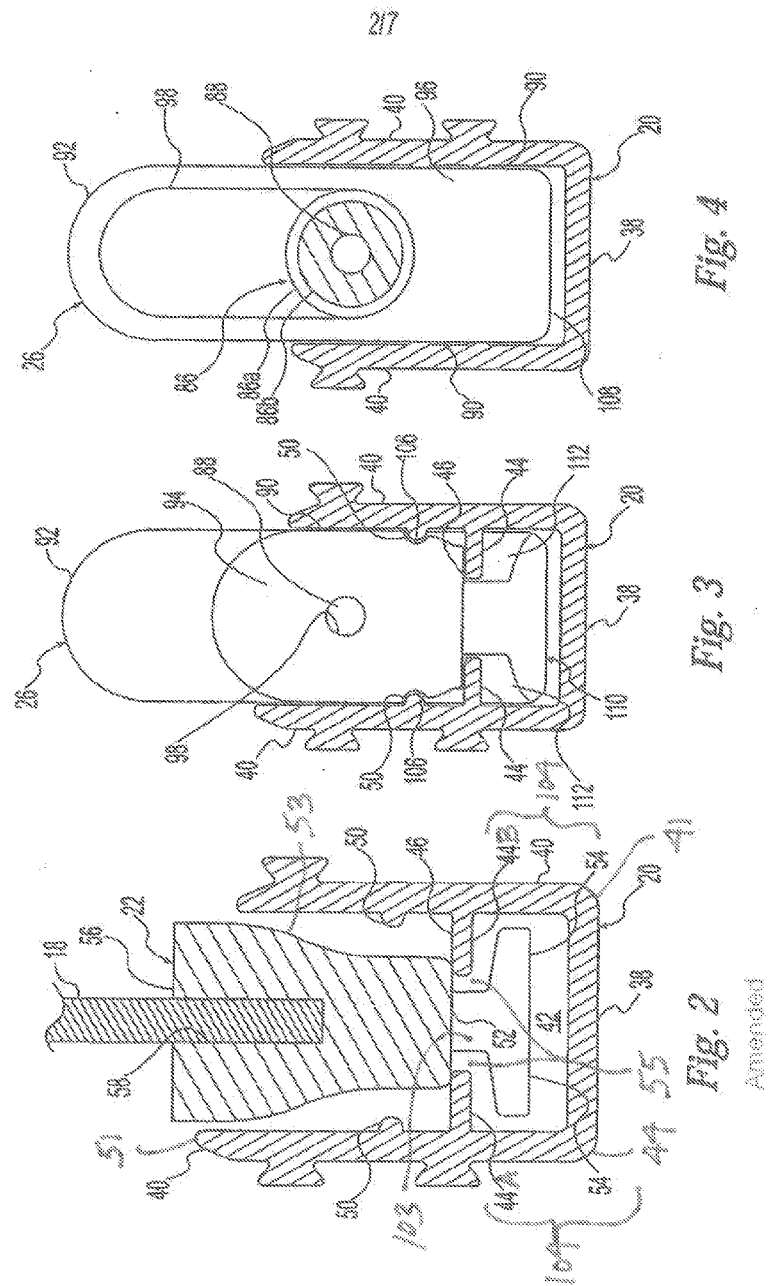

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, lines 17-41:

The sliding pane 18 is positioned, in its closed position, between the left and right fixed panes 14, 16 respectively. The sliding pane 18 and the left and right fixed panes 14. 16 are mounted in the [circuferential] *circumferential* frame 12. The circumferential frame 12 has substantially vertical left and right frame portions 28, 30, respectively, interconnected by substantially horizontal top and bottom frame portions 32, 34. *As seen in FIG. 1, top frame portion 32 may be curved.* The circumferential frame 12 preferably includes at least one unitary fall-circumference member extending all the way around the perimeter. The full circumference member 12 can be formed by injection molding in place around the fixed position panes. The circumferential frame 12 can be formed of any suitable material such as, for example, a plastic. A suitable plastic is, for example, GELOY which is available from the General Electric Company. Optional left and right mullions 36 can be positioned at the junction of the sliding pane 18, in its closed position, with the left and right fixed panes 14, 16, respectively. The circumferential frame 12 may further include appliques and the like to provide decorative "Show" surfaces, that is, surfaces which will be exposed to view during normal use of the window when it is installed in the motor vehicle window opening. It is within the ability of those skilled in the art, given the benefit of the present disclosure, to design and construct circumferential frames 12 suitable to specific applications.

Column 5, lines 5-23:

As best shown in FIGS. 2 to 5, the lower frame member 20 has a horizontal bottom wall 38 and vertical forward and rearward side walls 40 upwardly extending from the forward and rear edges of the bottom wall 38 to form a laterally extending channel 42 *and defining rounded exterior corners 41. Channel 42 may have two inwardly facing generally c-shaped portions 104 as illustrated in FIG. 2.* As seen in FIGS. 2 to 5, the lower frame member 20 has external longitudinal projections and the horizontal bottom wall 38 includes a hole. A pair of horizontal, opposed *fingers or* flanges 44 inwardly extend from the sides walls 40 within the channel [44] *42* toward each other. *Each flange 44, therefore, extends inwardly from a portion of side wall 40 that is above flange 44 and a portion of side wall 40 that is below flange 44.* The inner *ends or* edges of the flanges 44 are spaced apart to form a gap or space therebetween, *and may be rounded*. The flanges 44 are at the same height and their upper surfaces cooperate to form a support surface 46 for the pane guide bracket 22 as described in more detail hereinafter. The flanges 44 extend substantially the entire length of the lower frame member 20 but the ends of the illustrated flanges 44 are spaced apart from the ends of the forward and rearward walls 40 to accommodate the transition blocks 26 as described in more detail hereinafter. The ends 48 of the illustrated flanges 44 are arcuate, that is, curved to *form rounded corners and* cooperate with the transition blocks 26 as described in more detail hereinafter.

Column 5, lines 24-44:

A pair of horizontal, opposed *flanges,* protrusions or nibs 50 inwardly extend from the sides walls 40 within the channel 42 toward each other. *Each flange or protrusion 50, therefore, extends inwardly from a portion of side wall 40 that is above protrusion 50 and a portion of side wail 40 that is below protrusion 50.* The protrusions 50 are located above and spaced-apart from the flanges 44. The illustrated protrusions 50 are semi-circular in cross-section, *therefore, being rounded, or having a rounded corner*. The protrusions 50 are sized and shaped to cooperate with the transition block 26 to form a snap-fit connection as described in more detail hereinafter. The protrusions 50 extend substantially the entire length of the lower frame member 20 but the ends of the illustrated protrusions 50 are at or near the ends 48 of the flanges 44, that is, they are spaced apart from the ends 48 of the side walls 40 to accommodate the transition blocks 26 as described in more detail hereinafter. It is noted that the illustrated protrusions 50 extend the substantial length of the lower frame member but it is only necessary to provide the protrusions 50 along the portions of the side walls adjacent the transitions blocks 26. *As illustrated in FIG. 2, the side walls 40 may have different heights, with an upper end 51 of side wall 40 being rounded. As noted above, protrusions or nibs 50 may extend into channel 42 from side walls 40. However, in certain embodiments, flanges 44 extend further into channel 42 than do any other portions of side walls 40 that are disposed above and below each of flanges 44, such as nibs 50, for example.* The lower frame member 20 can be formed by extrusion and can comprise any suitable material such as a plastic or metal. A suitable plastic is believed to be DELRIN commercially available from the Dupont Corporation.

Column 5, lines 45-55:

As best shown in FIGS. 2 and 6, the pane guide bracket 22 is elongate with a generally rectangular-shaped cross section. The width of the guide bracket 22 is sized to fit between the side walls 40 of the lower frame member 20 so that the guide bracket 22 can longitudinally move within the channel 42 of the lower frame member 20. A *downwardly facing portion or bottom* surface 52 of the guide bracket 22 is generally planar and sized to engage the upper surfaces 46 of the lower frame member flanges 44 so that the guide bracket 22 is supported by the flanges 44 and is longitudinally slideable along the flanges 44 within the channel 42. *Guide bracket 22 may have a tapered portion 53 between side walls 40 and sliding pane 18 such that it is narrower proximate flanges 44.*

Column 5, line 56-column 6, line 27:

The guide bracket 22 is mechanically locked or secured to the lower frame member 20 to limit vertical movement of the guide bracket 22 relative to the lower frame member 20. The illustrated guide bracket 22 is secured to the lower frame member 20 with an interference formed by a snap-fit engagement or connection. The snap-fit connection eliminates the need for separate fasteners and makes installation quicker. The snap-fit connection relies upon the resiliency or position memory of at least one flexible or deformable member of a component to establish a position locking location relative to a corresponding member or orifice in the other member. Typically and preferably this is accomplished by simply pushing the two components together. The illustrated guide bracket 22 is provided with a pair of opposed legs 54 located near each end of the guide bracket 22. *A pair of slots 55 are formed between the downwardly facing portion or bottom surface 52 and legs 54.* The illustrated legs 54 are generally rectangular in cross-section. The legs 54 are spaced apart from the bottom surface 52 of the guide bracket 22 a distance adequate to receive the flanges 44 of the lower frame member 20 therebetween. The illustrated legs 54 are spaced apart from the bottom surface 2 a distance which permits limited movement of the guide bracket 22 relative to the lower frame member 20 but prevents further vertical movement of the guide bracket 22 when the legs 54 engage the flanges 44. The illustrated legs 54 are located near the ends of the guide bracket 22 and extend for a limited length but alternatively can extend for the length of the guide bracket 22. One or both of the guide bracket 22 and the lower frame member 20 are preferably formed of a resilient material so that the guide bracket 22 can be snap-fit into the lower frame member 20 by pushing the guide bracket 22 into the channel 42 as one or both of the flanges 44 and the legs 54 deflect to permit the legs 54 to pass below the flanges 44 and then resiliently snap back into their interfering position to limit vertical movement of the guide bracket 22 relative to the lower frame member 20. It is noted that the guide bracket 20 alternatively can be inserted into the lower frame member 20 by longitudinally sliding into the channel 42 from one of the ends of the channel 42. *Guide bracket 22 and its outwardly extending members or legs 54 are integrated with one another to be of unitary construction. Thus, members or legs 54 are fixed, non-rotatable and non-pivotable relative to the rest of guide bracket 22. In the embodiment illustrated in FIG. 2, legs 54 extend below flanges 44 within channel 42 such that guide bracket 22 is not supported on legs 54. As illustrated in FIG. 2 the portion 103 of guide bracket 22 that is disposed between flanges 44A and 44B may be rectangular in cross-section.*

THE DRAWING FIGURES HAVE BEEN CHANGED AS FOLLOWS:

On FIG. 2, reference characters 41, 44, 44A, 44B, 51, 53, 55, 103, 104 were added.

AS A RESULT OF REEXAMINATION, IT HAS BEEN DETERMINED THAT:

The patentability of claims 10-15, 18-22 and 26-30 is confirmed.

Claims 1 and 2 were previously cancelled.

Claims 3-6, 8, 9, 23-25, 31-33 and 35-47 are cancelled.

Claims 7, 16 and 34 are determined to be patentable as amended.

Claim 17, dependent on an amended claim, is determined to be patentable.

New claims 48-162 are added and determined to be patentable.

7. [The] *A* sliding window assembly [according to claim 5, further comprising] *for a motor vehicle comprising, in combination:* a frame member forming a channel having a length, a width, and a height;
a guide bracket located at least partially within the channel and slideable along the length of the channel;
a sliding pane;
at least one tab secured to the guide bracket [and], wherein the sliding pane is secured to the tab with adhesive *to substantially prevent relative movement between the sliding pane and the slot;*
*wherein the guide bracket forms a slot receiving an edge of the sliding pane so that the guide bracket carries the sliding pane between a closed position and an open position as the guide bracket and the slot move along the length of the channel; and*
*a pull-pull cable drive assembly operably secured to the guide bracket to move the sliding pane between the closed and open positions;*
*wherein the frame member forms an interference with the guide bracket to limit movement of the guide bracket in the direction of the height of the channel to limit movement of the guide bracket out of the channel, wherein the frame member has a bottom wall and a pair of side walls extending from opposite edges of the bottom wall to form the channel and opposed flanges inwardly extending from the side walls to form the interference with the guide bracket, wherein the guide bracket is at least partially supported by the flanges and slides along the flanges as the sliding pane is moved between the closed and open positions.*

16. The sliding window assembly according to claim 15, wherein the frame member has a bottom wall, a pair of side walls extending from opposite edges of the [side] *bottom* wall to form the channel, and opposed flanges inwardly extending from the side walls, and the guide block engages the flanges to form the second interference.

34. [The] *A* sliding window assembly [of claim 31 further comprising] *for a motor vehicle comprising, in combination:*
a sliding pane and two fixed panes;
a guide bracket;
a structural or semi-structural frame that integrates the sliding pane and the fixed panes as a self-contained pre-assembled module comprising a bottom portion forming a first channel;
a frame member at least partially located within the first channel and having a bottom wall and a pair of side walls extending from opposite edges of the bottom wall to form a second channel having a length, a width, and a height and opposed flanges inwardly extending from the side walls -
to form an interference with the guide bracket to limit movement of the guide bracket in the direction of the height of the second channel to limit movement of the guide bracket out of the frame member, and
thereby to space the sliding pane from the bottom wall of the second channel;
wherein the guide bracket -
is located at least partially within the second channel and slideable along the length of the channel; and
forms a slot receiving an edge of the sliding pane so that the guide bracket carries the sliding pane between a closed position and an open position as the guide bracket and the slot move along the length of the second channel;
a pull-pull cable drive assembly comprising drive cables and operably secured to the guide bracket to move the sliding pane between the closed and open positions; and first and second transition blocks located at least partially within the second channel of the frame member and each forming a passage through which one of the drive cables passes.

48. The sliding window assembly according to claim 26 wherein the guide bracket has a pair of unitary, opposed, outwardly extending legs that form the interference.

49. The sliding window assembly of claim 26 wherein the guide bracket has a pair of outwardly extending members that substantially extend along the length of the guide bracket and which the frame member can engage in forming the interference.

50. The sliding window assembly of claim 49 wherein the side walls of the channel have different heights.

51. The sliding window assembly of claim 26 wherein the pull-pull cable drive assembly is configured for mounting to a surface of the motor vehicle.

52. The sliding window assembly of claim 51 wherein the side walls of the channel have different heights.

53. The sliding window assembly of claim 51 wherein the cable drive assembly includes a motor adapted for use in the motor vehicle.

54. The sliding window assembly of claim 26 wherein the pull-pull cable drive assembly includes a motor adapted for use in a motor vehicle sliding window assembly.

55. The sliding window assembly of claim 54 wherein the side walls of the channel have different heights.

56. The sliding window assembly of claim 26 wherein the guide bracket includes a leg that is fixed relative to the rest of the guide bracket and which the frame member can engage in forming the interference.

57. The sliding window assembly of claim 56 wherein the side walls of the channel have different heights.

58. The sliding window assembly of claim 26 wherein the sliding pane extends into the channel.

59. The sliding window assembly of claim 58 wherein the side walls of the channel have different heights.

60. The sliding window assembly of claim 26 wherein the channel is wider than the sliding pane.

61. The sliding window assembly of claim 60 wherein the side walls of the channel have different heights.

62. The sliding window assembly of claim 26 wherein the interference is disposed in the channel and wherein the channel is disposed proximate to a bottom edge of the sliding pane and the pull-pull cable drive assembly pulls along an axis that is substantially aligned with bottom edge of the sliding pane.

63. The sliding window assembly of claim 62 wherein the side walls of the channel have different heights.

64. The sliding window assembly of claim 26 having a curved upper portion including an upper channel receiving the sliding pane and wherein the interference establishes a plane along which the sliding pane moves.

65. The sliding window assembly of claim 64 wherein the side walls of the channel have different heights.

66. The sliding window assembly of claim 26 wherein the sliding pane is fixed to the guide bracket by adhesive.

67. The sliding window assembly of claim 66 wherein the side walls of the channel have different heights.

68. The sliding window assembly of claim 26 wherein the sliding pane is fixed to the guide bracket by friction.

69. The sliding window assembly of claim 68 wherein the side walls of the channel have different heights.

70. The sliding window assembly of claim 26 wherein the guide bracket has a pair of legs extending laterally in the channel below the opposed flanges and the legs are located substantially at the ends of the guide bracket.

71. The sliding window assembly of claim 70 wherein the side walls of the channel have different heights.

72. The sliding window assembly of claim 26 further comprising a top frame portion and a bottom frame portion, wherein the frame member is located at the bottom frame portion and the top frame portion is curved.

73. The sliding window assembly of claim 72 wherein the side walls of the channel have different heights.

74. The sliding window assembly of claim 26 wherein the guide bracket has a pair of legs which the frame member can engage in forming the interference, and wherein a downwardly facing portion of the guide bracket is in the channel and the legs are spaced apart from the downwardly facing portion of the guide bracket a distance adequate to receive the flanges between the downwardly facing portion of the guide bracket and the legs.

75. The sliding window assembly of claim 74 wherein the side walls of the channel have different heights.

76. The sliding window assembly of claim 74 wherein the downwardly facing portion of the guide bracket and the legs form a slot along the length of the channel.

77. The sliding window assembly according to claim 26 wherein the guide bracket has a pair of legs which the frame member can engage in forming the interference and which are sufficiently resilient to deflect to pass below the flanges and then resiliently snap back into an interfering position to limit vertical movement of the guide bracket relative to the frame member.

78. The sliding window assembly of claim 77 wherein the side walls of the channel have different heights.

79. The window assembly of claim 26, wherein the guide bracket has a pair of legs which the frame member can engage in forming the interference and that extend below the flanges such that the guide bracket is not supported on the legs.

80. The sliding window assembly of claim 79 wherein the side walls of the channel have different heights.

81. The window assembly of claim 26, wherein the guide bracket has a planar surface that engages an upper surface of the flanges, and wherein the guide bracket has a pair of legs that the frame member can engage in forming the interference and that are disposed below the flanges that engage the planar surface.

82. The sliding window assembly of claim 81 wherein the side walls of the channel have different heights.

83. The window assembly of claim 26, further including a pick-up truck having an opening, the frame member positioned in the opening.

84. The sliding window assembly of claim 83 wherein the side walls of the channel have different heights.

85. The sliding window assembly of claim 26 wherein the opposed flanges include a first flange that extends laterally along the channel and has a rounded corner.

86. The sliding window assembly of claim 85 wherein the side walls of the channel have different heights.

87. The sliding window assembly of claim 26 wherein the opposed flanges include a first flange having a rounded edge.

88. The sliding window assembly of claim 26 wherein the side walls include at least a first side wall and a second side wall and wherein the opposed flanges include at least a first flange and a second flange, the first flange extending inwardly from the first side wall, a first portion of the first side wall above the first flange and a second portion of the first side wall below the first flange, and the second flange extending inwardly from the second side wall, a first portion of the second side wall above the second flange and a second portion of the second side wall below the second flange and wherein the sliding window assembly further comprises first and second opposed protrusions extending inwardly from the first and second side walls, respectively, the first protrusion extending along the channel below the top of the channel and above the first flange, and the second protrusion extending along the channel below the top of the channel and above the second flange.

89. The sliding window assembly of claim 88 wherein the first side wall and the second side wall have different heights.

90. The sliding window assembly of claim 88 further comprising fixed panes, wherein the fixed panes are disposed outside of the frame member forming the channel.

91. The sliding window assembly of claim 88 wherein the protrusions each is rounded.

92. The sliding window assembly of claim 88 wherein the protrusions extend inwardly less than the flanges.

93. The sliding window assembly of claim 26 wherein the sliding pane has a bottom, and wherein the side walls include a first side wall that extends above the bottom of the sliding pane.

94. The sliding window assembly of claim 26 wherein the side walls have different heights.

95. The sliding window assembly of claim 26 wherein at least a portion of the sliding pane is disposed between the side walls.

96. The sliding window assembly of claim 95 wherein the side walls of the channel have different heights.

97. The sliding window assembly of claim 26 wherein an upper edge of at least one sidewall is rounded.

98. The sliding window assembly of claim 97 wherein the side walls of the channel have different heights.

99. The sliding window assembly of claim 26 wherein the opposed flanges include at least a first flange extending inwardly from each of the side walls, a first portion of the respective side wall above the first flange and a second portion of the respective side wall below the first flange, and wherein each side wall further comprises a second flange spaced from the top and bottom of the frame member.

100. The sliding window assembly according to claim 99 wherein at least a portion of the guide bracket is disposed between the first and second flanges.

101. The sliding window assembly according to claim 99 wherein the side walls of the channel have different heights.

102. The sliding window assembly of claim 99 wherein an end wall of the first flange is rounded and an end wall of the second flange is rounded.

103. The sliding window assembly according to claim 102 wherein at least a portion of the guide bracket is disposed between first and second flanges.

104. The sliding window assembly of claim 102 wherein the side walls of the channel have different heights.

105. The sliding window assembly of claim 99 wherein each of the side walls has a third flange spaced from the top and bottom of the frame member.

106. The sliding window assembly of claim 26 wherein the side walls include at least a first side wall and a second side wall, and wherein a the opposed flanges include a first flange extending inwardly from the first side wall, a first portion of the first side wall above the first flange and a second portion of the first side wall below the first flange, and wherein a second flange extends from the first side wall in an opposite direction from the first flange.

107. The sliding window assembly according to claim 106 wherein at least a portion of the guide bracket is disposed between the first and second flanges.

108. The sliding window assembly of claim 106 wherein the side walls of the channel have different heights.

109. The sliding window assembly of claim 26 wherein two outside corners of the frame member are rounded.

110. The sliding window assembly of claim 109 wherein the side walls of the channel have different heights.

111. The sliding window assembly of claim 26 wherein the guide bracket has at least a portion tapered in a direction perpendicular to the channel.

112. The sliding window assembly of claim 111 wherein the side walls of the channel have different heights.

113. The sliding window assembly of claim 26 wherein the guide bracket is tapered in an area between the side walls and the sliding pane.

114. The sliding window assembly of claim 113 wherein the side walls of the channel have different heights.

115. The sliding window assembly of claim 26, wherein the guide bracket receives a lower edge of the sliding pane.

116. The sliding window assembly of claim 115 wherein the side walls of the channel have different heights.

117. The sliding window assembly of claim 28, wherein the side walls of the lower channel have different heights.

118. A sliding window assembly for a motor vehicle comprising, in combination:

a sliding pane and two fixed panes;

a guide bracket;

a structural or semi-structural frame that integrates the sliding pane and the fixed panes as a self-contained pre-assembled module comprising a bottom portion forming a first channel;

a frame member at least partially located within the first channel and having a bottom wall and a pair of side walls extending from opposite edges of the bottom wall to form a second channel having a length, a width, and a height and opposed flanges inwardly extending from the side walls - to form an interference with the guide bracket to limit movement oft guide bracket in the direction of the height of the second channel to limit movement of the guide bracket out of the frame member, and thereby to space the sliding pane from the bottom wall of the second channel;

wherein the guide bracket is located at least partially within the second channel and slideable along the length of the channel; and forms a slot receiving an edge of the sliding pane so that the guide bracket carries the sliding pane between a closed position and an open position as the guide bracket and the slot move along the length of the second channel; and a pull-pull cable drive assembly comprising drive cables and operably secured to the guide bracket to move the sliding pane between the closed and open positions;

wherein the side walls include at least a first side wall and a second side wall and the opposed flanges include at least a first flange and a second flange, and at least a portion of the guide bracket is disposed between the first and second flanges, the first flange extending from the first side wall, a first portion of the first side wall above the first flange and a second portion of the first side wall below the first flange, and the second flange extending from the second side wall, a first portion of the second side wall above the second flange and a second portion of the second side wall below the second flange.

119. The sliding window assembly of claim 118, wherein the side walls of the second channel have different heights.

120. A sliding window assembly for a motor vehicle comprising, in combination:
  a frame member forming a channel having a length, a width, and a height;
  a guide bracket located at least partially within the channel and slideable along the length of the channel;
  a sliding pane;
  wherein the guide bracket forms a slot receiving an edge of the sliding pane so that the guide bracket carries the sliding pane between a closed position and an open position as the guide bracket and the slot move along the length of the channel;
  a pull-pull cable drive assembly operably secured to the guide bracket to move the sliding pane between the closed and open positions; and
  wherein the frame member forms an interference with the guide bracket to limit movement of the guide bracket in the direction of the height of the channel to limit movement of the guide bracket out of the channel, wherein the frame member has a bottom wall and a pair of side walls to form the channel and opposed flanges inwardly extending from the side walls to form the interference with the guide bracket, wherein the guide bracket is at least partially supported by the flanges and slides along the flanges as the sliding pane is moved between the closed and open positions; and
  wherein the side walls include at least a first side wall and a second side wall and the opposed flanges include at least a first flange and a second flange, and at least a portion of the guide bracket is disposed between the first and second flanges, the first flange extending from the first side wall, a first portion of the first side wall above the first flange and a second portion of the first side wall below the first flange, and the second flange extending from the second side wall, a first portion of the second side wall above the second flange and a second portion of the second side wall below the second flange.

121. The sliding window assembly of claim 120, wherein the side walls of the channel have different heights.

122. A sliding window assembly for a motor vehicle comprising, in combination:
  a frame member forming a channel having a length, a width, and a height;
  a guide bracket located at least partially within the channel and slideable along the length of the channel;
  a sliding pane;
  wherein the guide bracket forms a slot receiving an edge of the sliding pane so that the guide bracket carries the sliding pane between a closed position and an open position as the guide bracket and the slot move along the length of the channel;
  a pull-pull cable drive assembly operably secured to the guide bracket to move the sliding pane between the closed and open positions; and
  wherein the frame member forms an interference with the guide bracket to limit movement of the guide bracket in the direction of the height of the channel to limit movement of the guide bracket out of the channel, wherein the frame member has a bottom wall and a pair of side walls extending from opposite edges of the bottom wall to form the channel and opposed flanges inwardly extending from the side walls to form the interference with the guide bracket, wherein the guide bracket is at least partially supported by the flanges and slides along the flanges as the sliding pane is moved between the closed and open positions;
  wherein the guide bracket is configured to be spaced from the bottom wall; and
  wherein the side walls include at least a first side wall and a second side wall and the opposed flanges include at least a first flange and a second flange, and at least a portion of the guide bracket is disposed between the first and second flanges, the first flange extending from the first side wall, a first portion of the first side wall above the first flange and a second portion of the first side wall below the first flange, and the second flange extending from the second side wall, a first portion of the second side wall above the second flange and a second portion of the second side wall below the second flange.

123. The sliding window assembly of claim 122, wherein the side walls of the channel have different heights.

124. The sliding window assembly of claim 26, wherein the frame member has protrusions spaced-apart from the flanges.

125. The sliding window assembly of claim 124 wherein the side walls of the channel have different heights.

126. The sliding window assembly of claim 124, wherein the protrusions inwardly extend from the sides walls within the channel and are located above the flanges.

127. The sliding window assembly of claim 126 wherein the side walls of the channel have different heights.

128. The sliding window assembly of claim 26, wherein the guide bracket has a bottom surface that is generally planar and legs extending below the flanges, the generally planar surface of the guide bracket engaging the upper surfaces of the flanges so that the guide bracket is supported by the flanges and is longitudinally slideable along the flanges within the channel.

129. The sliding window assembly of claim 128 wherein the side walls of the channel have different heights.

130. The sliding window assembly of claim 10, wherein the frame member forms a third interference with the guide bracket that limits vertical movement of the guide bracket in the direction of the height of the channel and substantially prevents the sliding pane from tilting as the sliding pane is pulled by the pull-pull cable drive assembly.

131. The sliding window assembly of claim 130 wherein the side walls of the channel have different heights.

132. The sliding window assembly of claim 14, wherein the frame member forms a third interference with the guide bracket that limits vertical movement of the guide bracket in the direction of the height of the channel and substantially prevents the sliding pane from tilting as the sliding pane is pulled by the pull-pull cable drive assembly.

133. The sliding window assembly of claim 132 wherein the side walls of the channel have different heights.

134. The sliding window assembly of claim 15, wherein the frame member forms a third interference with the guide bracket that limits vertical movement of the guide bracket in the direction of the height of the channel and substantially prevents the sliding pane from tilting as the sliding pane is pulled by the pull-pull cable drive assembly.

135. The sliding window assembly of claim 134 wherein the side walls of the channel have different heights.

136. The sliding window assembly of claim 18, wherein the frame member forms an interference with the guide bracket that limits vertical movement of the guide bracket in the direction of the height of the channel and substantially prevents the sliding pane from tilting as the sliding pane is pulled by the pull-pull cable drive assembly.

137. The sliding window assembly of claim 136 wherein the side walls of the channel have different heights.

138. The sliding window assembly of claim 26, wherein the guide bracket has a pair of legs which the frame member can engage in forming the interference and that extend the length of the guide bracket.

139. The sliding window assembly of claim 138 wherein the side walls of the channel have different heights.

140. The sliding window assembly of claim 10, further comprising at least one tab secured to the guide bracket and wherein the sliding pane is secured to the tab with adhesive.

141. The sliding window assembly of claim 140 wherein the frame member has side walls including at least a first side wall and a second side wall, and the side walls of the channel have different heights.

142. The sliding window assembly of claim 14, further comprising at least one tab secured to the guide bracket and wherein the sliding pane is secured to the tab with adhesive.

143. The sliding window assembly of claim 142 wherein the frame member has side walls including at least a first side wall and a second side wall, and the side walls of the channel have different heights.

144. The sliding window assembly of claim 15, further comprising at least one tab secured to the guide bracket and wherein the sliding pane is secured to the tab with adhesive.

145. The sliding window assembly of claim 144 wherein the frame member has side walls including at least a first side wall and a second side wall, and the side walls of the channel have different heights.

146. A sliding window assembly for a motor vehicle comprising, in combination:
   a sliding pane and a pair of fixed panes;
   a structural or semi-structural frame member that integrates the sliding pane and the fixed panes as a self-contained pre-assembled module, the frame member forming a channel having a length, a width, and a height;
   a guide bracket located at least partially within the channel and slideable along the length of the channel;
   wherein the guide bracket forms a slot receiving an edge of the sliding pane so that the guide bracket carries the sliding pane between a closed position and an open position as the guide bracket and the slot move along the length of the channel and has a pair of legs; and
   a pull-pull cable drive assembly operably secured to the guide bracket to move the sliding pane between the closed and open positions;
   the frame member forming an interference with the legs of the guide bracket to limit movement of the guide bracket in the direction of the height of the channel to limit movement of the guide bracket out of the channel; and
   further comprising at least one tab secured to the guide bracket and wherein the sliding pane is secured to the tab with adhesive.

147. The sliding window assembly of claim 146 wherein the frame member has side walls including at least a first side wall and a second side wall, and the side walls of the channel have different heights.

148. The sliding window assembly of claim 26, further comprising at least one tab secured to the guide bracket and wherein the sliding pane is secured to the tab with adhesive.

149. The sliding window assembly of claim 148 wherein the side walls of the channel have different heights.

150. The sliding window assembly of claim 28, further comprising at least one tab secured to the guide bracket and wherein the sliding pane is secured to the tab with adhesive.

151. The sliding window assembly of claim 150 wherein the side walls of the channel have different heights.

152. A sliding window assembly for a motor vehicle comprising, in combination:
   a sliding pane and two fixed panes;
   a guide bracket;
   a structural or semi-structural frame that integrates the sliding pane and the fixed panes as a self-contained pre-assembled module comprising a bottom portion forming a first channel;
   a frame member at least partially located within the first channel and having a bottom wall and a pair of side walls extending from opposite edges of the bottom wall to form a second channel having a length, a width, and a height and opposed flanges inwardly extending from the side walls -
   to form an interference with the guide bracket to limit movement of the guide bracket in the direction of the height of the second channel to limit movement of the guide bracket out of the frame member, and
   thereby to space the sliding vane from the bottom wall of the second channel;
   wherein the guide bracket
   is located at least partially within the second channel and slideable along the length of the channel; and
   forms a slot receiving an edge of the sliding pane so that the guide bracket carries the sliding pane between a closed position and an open position as the guide bracket and the slot move along the length of the second channel;
   a pull-pull cable drive assembly comprising drive cables and operably secured to the guide bracket to move the sliding pane between the closed and open positions; and
   at least one tab secured to the guide bracket;
   wherein the sliding pane is secured to the tab with adhesive.

153. The sliding window assembly according to claim 152 the side walls include at least a first side wall and a second side wall and the opposed flanges include at least a first flange and a second flange, and at least a portion of the guide bracket is disposed between the first and second flanges, the first flange extending from the first side wall, a first portion of the first side wall above the first flange and a second portion of the first side wall below the first flange, and the second flange extending from the second side wall, a first portion of the second side wall above the second flange and a second portion of the second side wall below the second flange.

154. The sliding window assembly of claim 153 wherein the side walls of the channel have different heights.

155. A sliding window assembly for a motor vehicle comprising, in combination:
   a frame member forming a channel having a length, a width, and a height;
   a guide bracket located at least partially within the channel and slideable along the length of the channel;
   a sliding pane;
   wherein the guide bracket forms a slot receiving an edge of the sliding pane so that the guide bracket carries the sliding pane between a closed position and an open position as the guide bracket and the slot move along the length of the channel;
   a pull-pull cable drive assembly operably secured to the guide bracket to move the sliding pane between the closed and open positions;
   wherein the frame member forms an interference with the guide bracket to limit movement of the guide bracket in the direction of the height of the channel to limit movement of the guide bracket out of the channel, wherein the frame member has a bottom wall and a pair of side walls to form the channel and opposed flanges inwardly extending from the side walls to form the interference with the guide bracket, wherein the guide bracket is at least partially supported by the flanges and slides along the flanges as the sliding pane is moved between the closed and open positions; and at least one tab secured to the guide bracket and wherein the sliding pane is secured to the tab with adhesive.

156. The sliding window assembly according to claim 155 wherein the side walls include at least a first side wall and a second side wall and the opposed flanges include at least a first flange and a second flange, and at least a portion of the guide bracket is disposed between the first and second flanges, the first flange extending from the first side wall, a first portion of the first side wall above the first flange and a second portion of the first side wall below the first flange, and the second flange extending from the second side wall, a first portion of the second side wall above the second flange and a second portion of the second side wall below the second flange.

157. The sliding window assembly of claim 155 wherein the side walls of the channel have different heights.

158. A sliding window assembly for a motor vehicle comprising, in combination:

a frame member forming a channel having a length, a width, and a height;

a guide bracket located at least partially within the channel and slideable along the length of the channel;

a sliding pane;

wherein the guide bracket forms a slot receiving an edge of the sliding pane so that the guide bracket carries the sliding pane between a closed position and an open position as the guide bracket and the slot move along the length of the channel;

a pull-pull cable drive assembly operably secured to the guide bracket to move the sliding pane between the closed and open positions;

wherein the frame member forms an interference with the guide bracket to limit movement of the guide bracket in the direction of the height of the channel to limit movement of the guide bracket out of the channel, wherein the frame member has a bottom wall and a pair of side walls extending from opposite edges of the bottom wall to form the channel and opposed flanges inwardly extending from the side walls to form the interference with the guide bracket, wherein the guide bracket is at least partially supported by the flanges and slides along the flanges as the sliding pane is moved between the closed and open positions; and wherein the guide bracket is configured to be spaced from the bottom wall; and at least one tab secured to the guide bracket and wherein the sliding pane is secured to the tab with adhesive.

159. The sliding window assembly according to claim 158 wherein the side walls include at least a first side wall and a second side wall and the opposed flanges include at least a first flange and a second flange, and at least a portion of the guide bracket is disposed between the first and second flanges, the first flange extending from the first side wall, a first portion of the first side wall above the first flange and a second portion of the first side wall below the first flange, and the second flange extending from the second side wall, a first portion of the second side wall above the second flange and a second portion of the second side wall below the second flange.

160. The sliding window assembly of claim 158 wherein the side walls of the channel have different heights.

161. A sliding window assembly for a motor vehicle comprising, in combination:

a sliding pane and a pair of fixed panes;

a frame member that integrates the sliding pane and the fixed panes as a self-contained pre-assembled module, the frame member forming a channel having a length, a width, and a height;

a guide bracket located at least partially within the channel and slideable along the length of the channel;

wherein the guide bracket forms a slot receiving an edge of the sliding pane so that the guide bracket carries the sliding pane between a closed position and an open position as the guide bracket and the slot move along the length of the channel and has a pair of legs;

a pull-pull cable drive assembly operably secured to the guide bracket to move the sliding pane between the closed and open positions;

the frame member forming an interference with the legs of the guide bracket to limit movement of the guide bracket in the direction of the height of the channel to limit movement of the guide bracket out of the channel;

transition blocks at least partially disposed in the channel; and at least one tab secured to the guide bracket;

wherein the sliding pane is secured to the tab with adhesive.

162. The sliding window assembly of claim 161 wherein the channel has side walls and the side walls of the channel have different heights.

* * * * *